US012168568B2

(12) United States Patent
Rocholl et al.

(10) Patent No.: US 12,168,568 B2
(45) Date of Patent: Dec. 17, 2024

(54) CYCLOIDAL DRIVE TRANSMISSION

(71) Applicant: Oshkosh Corporation, Oshkosh, WI (US)

(72) Inventors: Joshua D. Rocholl, Rochester, MN (US); Derek A. Wente, Austin, MN (US); John T. Kellander, Oronoco, MN (US); Cody D. Clifton, Mapleton, MN (US); Vincent Hoover, Byron, MN (US); Zachary L. Klein, Rochester, MN (US); Clinton T. Weckwerth, Pine Island, MN (US); Skylar A. Wachter, Dodge Center, MN (US); Andrew Kotloski, Oshkosh, WI (US); Wallace Buege, West Bend, WI (US); Caleb Binder, Oshkosh, WI (US); Martin J. Schimke, Redgranite, WI (US)

(73) Assignee: Oshkosh Corporation, Oshkosh, WI (US)

( * ) Notice: Subject to any disclaimer, the term of this patent is extended or adjusted under 35 U.S.C. 154(b) by 36 days.

(21) Appl. No.: 17/681,091

(22) Filed: Feb. 25, 2022

(65) Prior Publication Data
US 2022/0267090 A1   Aug. 25, 2022

Related U.S. Application Data

(63) Continuation-in-part of application No. 16/851,309, filed on Apr. 17, 2020, now Pat. No. 11,414,267.
(Continued)

(51) Int. Cl.
| | |
|---|---|
| *B65F 3/04* | (2006.01) |
| *B65F 3/02* | (2006.01) |

(Continued)

(52) U.S. Cl.
CPC ............... *B65F 3/041* (2013.01); *F16H 1/32* (2013.01); *F16H 19/08* (2013.01);
(Continued)

(58) Field of Classification Search
CPC .................................. F16H 1/32; F16H 19/08
See application file for complete search history.

(56) References Cited

U.S. PATENT DOCUMENTS

| | | | |
|---|---|---|---|
| 2,376,010 A | 5/1945 | Sacchini et al. | |
| 2,708,848 A | 5/1955 | Hohenner | |

(Continued)

FOREIGN PATENT DOCUMENTS

| | | | |
|---|---|---|---|
| CN | 1300266 A | 6/2001 | |
| CN | 107654611 A | * 2/2018 | ............. F16H 55/17 |

(Continued)

OTHER PUBLICATIONS

Cart Tippers, McNeilus Refuse—Catalog, URL: https://www.streetsmartparts.com/refuse/cart-tippers-c510.html, Retrieved Sep. 9, 2020, 1 page.

*Primary Examiner* — James Keenan
(74) *Attorney, Agent, or Firm* — Foley & Lardner LLP

(57) ABSTRACT

A tipper assembly includes a base configured to couple to a tailgate of the refuse vehicle and an actuator assembly comprising an actuator and a transmission device. The actuator may be coupled to the transmission device and may be configured to provide an input to the transmission device. The transmission device may be configured to reduce a speed of the input. The tipper assembly further includes an arm extending from and pivotally coupled to at least one of the actuator assembly or the base and an implement coupled to the arm. The implement may be configured to engage with a refuse container and facilitate the dumping of contents within the refuse container into an opening in the tailgate.

14 Claims, 25 Drawing Sheets

Related U.S. Application Data

(60) Provisional application No. 62/842,919, filed on May 3, 2019.

(51) Int. Cl.
*F16H 1/32* (2006.01)
*F16H 19/08* (2006.01)

(52) U.S. Cl.
CPC . *B65F 2003/023* (2013.01); *B65F 2003/0256* (2013.01); *B65F 2003/0279* (2013.01); *F16H 2001/325* (2013.01)

(56) References Cited

U.S. PATENT DOCUMENTS

| | | | |
|---|---|---|---|
| 3,732,997 | A | 5/1973 | Reavis |
| 4,042,137 | A | 8/1977 | Hughes et al. |
| 4,741,658 | A | 5/1988 | Zelinka et al. |
| 4,852,594 | A | 8/1989 | Chen |
| 5,004,392 | A | 4/1991 | Naab |
| 5,026,241 | A | 6/1991 | Wyman |
| 5,919,027 | A | 7/1999 | Christenson |
| 5,934,858 | A | 8/1999 | Christenson |
| 5,934,867 | A | 8/1999 | Christenson |
| 5,938,394 | A | 8/1999 | Christenson |
| 5,951,235 | A | 9/1999 | Young et al. |
| 5,967,731 | A | 10/1999 | Brandt |
| 5,971,694 | A | 10/1999 | McNeilus et al. |
| 5,984,609 | A | 11/1999 | Bartlett |
| 6,033,176 | A | 3/2000 | Bartlett |
| 6,062,803 | A | 5/2000 | Christenson |
| 6,089,813 | A | 7/2000 | McNeilus et al. |
| 6,120,235 | A | 9/2000 | Humphries et al. |
| 6,123,500 | A | 9/2000 | McNeilus et al. |
| 6,210,094 | B1 | 4/2001 | McNeilus et al. |
| 6,213,706 | B1 | 4/2001 | Christenson |
| 6,224,318 | B1 | 5/2001 | McNeilus et al. |
| 6,315,515 | B1 | 11/2001 | Young et al. |
| 6,336,783 | B1 | 1/2002 | Young et al. |
| 6,350,098 | B1 | 2/2002 | Christenson et al. |
| 6,390,758 | B1 | 5/2002 | McNeilus et al. |
| 6,447,239 | B2 | 9/2002 | Young et al. |
| 6,474,928 | B1 | 11/2002 | Christenson |
| 6,565,305 | B2 | 5/2003 | Schrafel |
| 7,070,382 | B2 | 7/2006 | Pruteanu et al. |
| 7,073,620 | B2 | 7/2006 | Braun et al. |
| 7,198,130 | B2 | 4/2007 | Schimke |
| 7,258,194 | B2 | 8/2007 | Braun et al. |
| 7,284,943 | B2 | 10/2007 | Pruteanu et al. |
| 7,357,203 | B2 | 4/2008 | Morrow et al. |
| 7,448,460 | B2 | 11/2008 | Morrow et al. |
| 7,556,468 | B2 | 7/2009 | Grata |
| 7,559,735 | B2 | 7/2009 | Pruteanu et al. |
| 7,824,293 | B2 | 11/2010 | Schimke |
| 7,878,750 | B2 | 2/2011 | Zhou et al. |
| 7,931,103 | B2 | 4/2011 | Morrow et al. |
| 8,123,645 | B2 | 2/2012 | Schimke |
| 8,182,194 | B2 | 5/2012 | Pruteanu et al. |
| 8,215,892 | B2 | 7/2012 | Calliari |
| 8,337,352 | B2 | 12/2012 | Morrow et al. |
| 8,360,706 | B2 | 1/2013 | Addleman et al. |
| 8,540,475 | B2 | 9/2013 | Kuriakose et al. |
| 8,561,735 | B2 | 10/2013 | Morrow et al. |
| 8,807,613 | B2 | 8/2014 | Howell et al. |
| 8,864,613 | B2 | 10/2014 | Morrow et al. |
| 9,005,065 | B2 | 4/2015 | Huang et al. |
| 9,174,686 | B1 | 11/2015 | Oshkosh |
| 9,216,856 | B2 | 12/2015 | Howell et al. |
| 9,387,985 | B2 | 7/2016 | Gillmore et al. |
| 9,428,042 | B2 | 8/2016 | Morrow et al. |
| 9,650,032 | B2 | 5/2017 | Kotloski et al. |
| 9,651,120 | B2 | 5/2017 | Morrow et al. |
| 9,656,659 | B2 | 5/2017 | Shukla et al. |
| 9,707,869 | B1 | 7/2017 | Messina et al. |
| 9,880,581 | B2 | 1/2018 | Kuriakose et al. |
| 9,908,520 | B2 | 3/2018 | Shukla et al. |
| 9,970,515 | B2 | 5/2018 | Morrow et al. |
| 9,981,803 | B2 | 5/2018 | Davis et al. |
| 10,023,406 | B2 * | 7/2018 | Klubertanz ............ B65G 33/34 |
| 10,029,555 | B2 | 7/2018 | Kotloski et al. |
| 10,029,556 | B2 | 7/2018 | Morrow et al. |
| 10,160,438 | B2 | 12/2018 | Shukla et al. |
| 10,196,205 | B2 | 2/2019 | Betz et al. |
| 10,267,390 | B2 | 4/2019 | Morrow et al. |
| 10,357,995 | B2 | 7/2019 | Palmer et al. |
| 10,414,067 | B2 | 9/2019 | Datema et al. |
| 10,421,350 | B2 | 9/2019 | Morrow et al. |
| 10,435,026 | B2 | 10/2019 | Shively et al. |
| 10,457,134 | B2 | 10/2019 | Morrow et al. |
| 10,457,533 | B2 | 10/2019 | Puszkiewicz et al. |
| 10,558,234 | B2 | 2/2020 | Kuriakose et al. |
| 10,578,195 | B2 | 3/2020 | Steinberger et al. |
| 10,584,775 | B2 | 3/2020 | Steinberger et al. |
| 10,610,429 | B2 * | 4/2020 | Heneveld, Jr. .......... F16H 19/08 |
| 10,661,986 | B2 | 5/2020 | Price et al. |
| 11,607,800 | B2 * | 3/2023 | Zhang ...................... F16H 1/32 |
| 2002/0141855 | A1 | 10/2002 | Arrez et al. |
| 2003/0130765 | A1 | 7/2003 | Pillar et al. |
| 2005/0169734 | A1 | 8/2005 | Arrez et al. |
| 2007/0166136 | A1 | 7/2007 | Arrez |
| 2007/0183872 | A1 | 8/2007 | Arrez et al. |
| 2013/0205942 | A1 * | 8/2013 | Chicurel Uziel ......... F16H 1/32 74/572.2 |
| 2013/0251485 | A1 | 9/2013 | Howell et al. |
| 2017/0341860 | A1 | 11/2017 | Dodds et al. |
| 2018/0250847 | A1 | 9/2018 | Wurtz et al. |
| 2018/0326832 | A1 | 11/2018 | Kotloski et al. |
| 2019/0091890 | A1 | 3/2019 | Rocholl et al. |
| 2019/0111910 | A1 | 4/2019 | Shukla et al. |
| 2019/0121353 | A1 | 4/2019 | Datema et al. |
| 2019/0161272 | A1 | 5/2019 | Betz et al. |
| 2019/0193934 | A1 | 6/2019 | Rocholl et al. |
| 2019/0242460 | A1 | 8/2019 | Morrow et al. |
| 2019/0322321 | A1 | 10/2019 | Schwartz et al. |
| 2019/0325220 | A1 | 10/2019 | Wildgrube et al. |
| 2019/0344475 | A1 | 11/2019 | Datema et al. |
| 2019/0360600 | A1 | 11/2019 | Jax et al. |
| 2019/0366828 | A1 | 12/2019 | Morrow et al. |
| 2020/0039341 | A1 | 2/2020 | Morrow et al. |
| 2020/0078986 | A1 | 3/2020 | Clifton et al. |
| 2020/0102145 | A1 | 4/2020 | Nelson et al. |
| 2020/0200237 | A1 | 6/2020 | Steinberger et al. |
| 2020/0200238 | A1 | 6/2020 | Steinberger et al. |
| 2020/0230841 | A1 | 7/2020 | Datema et al. |
| 2020/0230842 | A1 | 7/2020 | Datema et al. |
| 2020/0262328 | A1 | 8/2020 | Nelson et al. |
| 2020/0262366 | A1 | 8/2020 | Wildgrube et al. |
| 2020/0265656 | A1 | 8/2020 | Koga et al. |
| 2021/0364046 | A1 * | 11/2021 | Kernbaum ................. F16D 3/48 |

FOREIGN PATENT DOCUMENTS

| | | | | |
|---|---|---|---|---|
| DE | 4417737 | A1 * | 12/1994 | ............... B65F 3/04 |
| DE | 102008013940 | A1 * | 9/2009 | ............. B65F 3/041 |
| DE | 202011004125 | U1 * | 6/2011 | ............. B65F 3/046 |
| DE | 102013102996 | A1 * | 9/2014 | ............... F16H 1/32 |
| EP | 2457850 | A1 * | 5/2012 | ............. B65F 3/046 |
| ES | 2746988 | T3 * | 3/2020 | ............. B65G 33/34 |

* cited by examiner

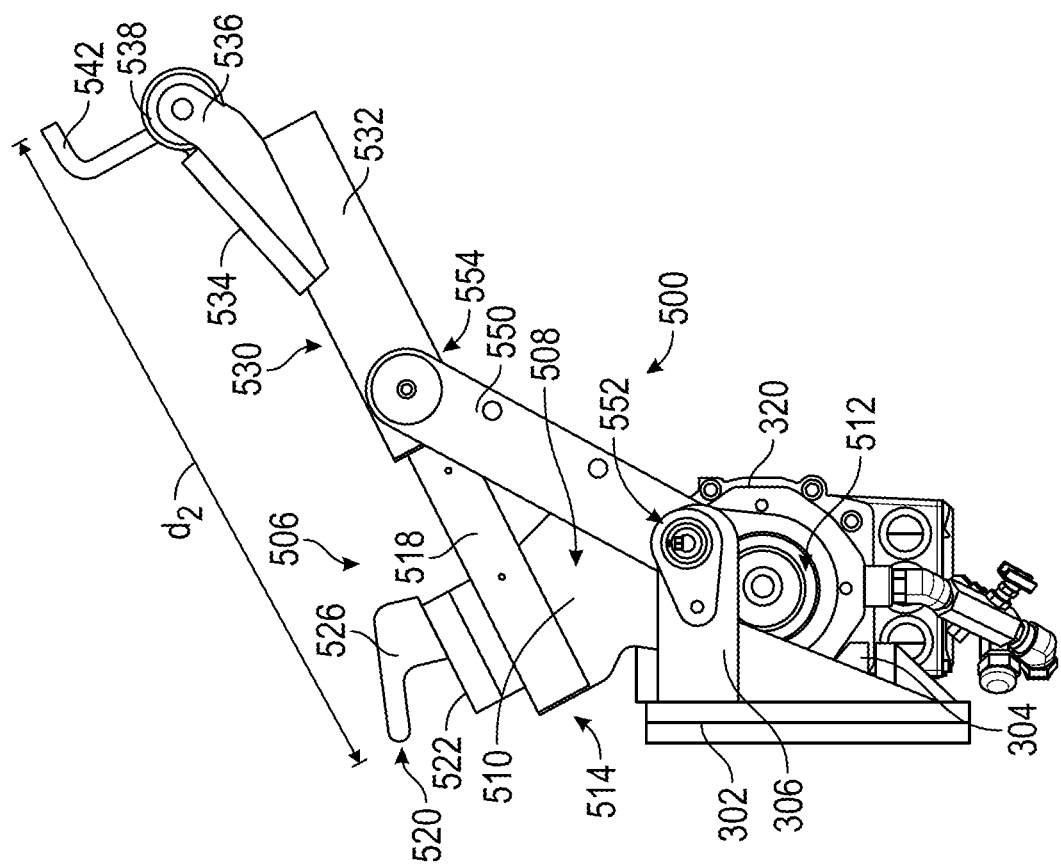
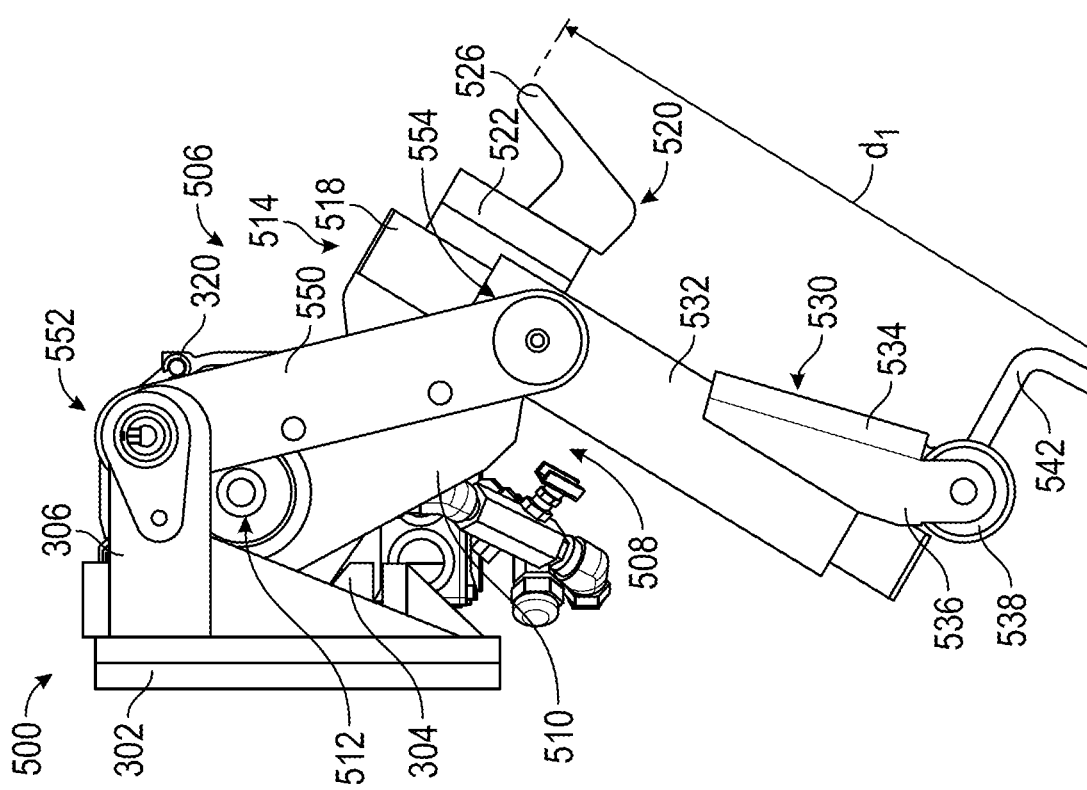
FIG. 11
FIG. 10

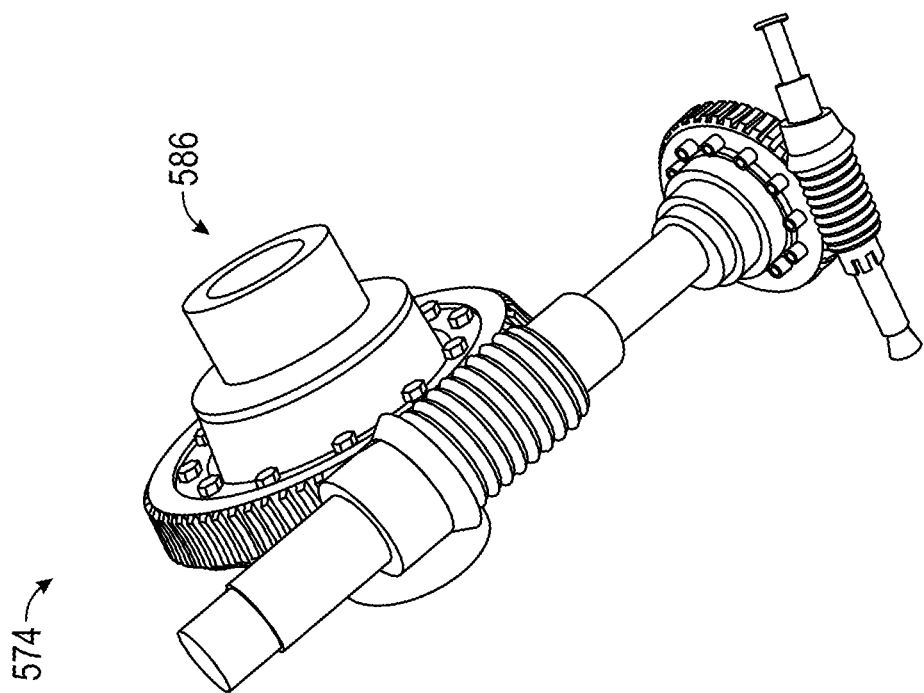
FIG. 16
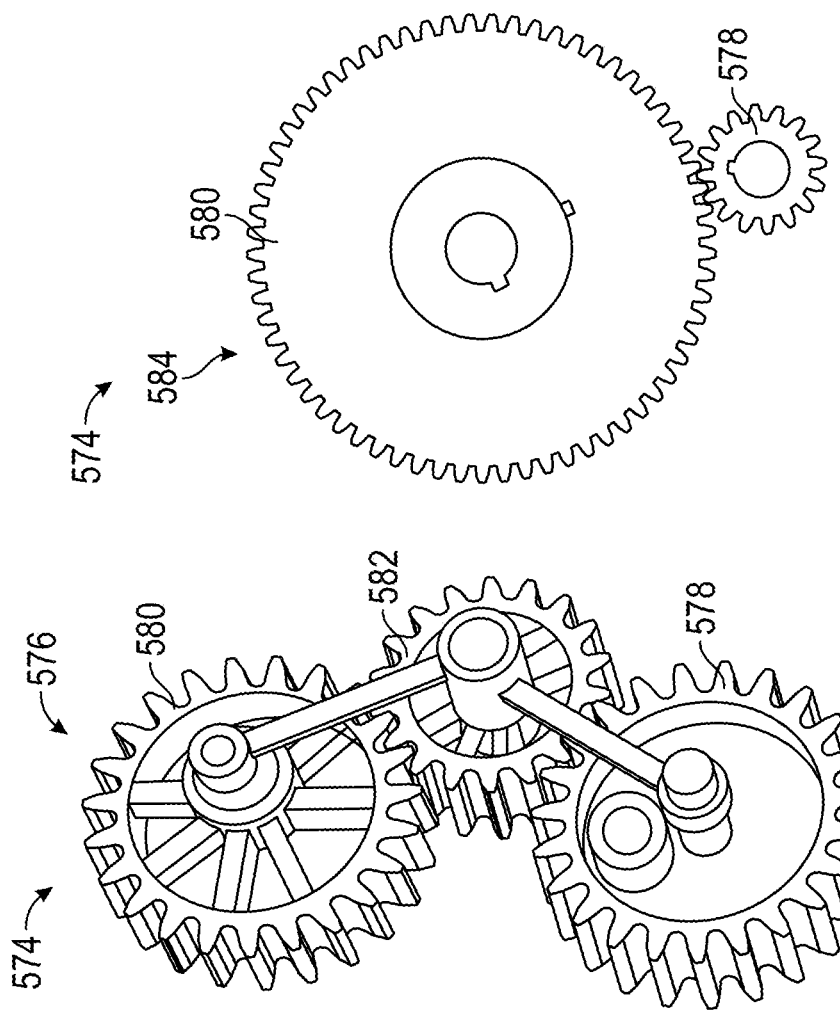
FIG. 15
FIG. 14

CYCLOIDAL DRIVE TRANSMISSION

CROSS-REFERENCE TO RELATED PATENT APPLICATION

This application is a continuation-in-part of U.S. patent application Ser. No. 16/851,309, filed Apr. 17, 2020, which claims the benefit of U.S. Provisional Patent Application No. 62/842,919, filed May 3, 2019, both of which are incorporated herein by reference in their entireties.

BACKGROUND

Refuse vehicles collect a wide variety of waste, trash, and other material from residences and businesses. Operators of the refuse vehicles transport the material from various waste receptacles within a municipality to a storage or processing facility (e.g., a landfill, an incineration facility, a recycling facility, etc.).

SUMMARY

One embodiment relates to a tipper assembly for a refuse vehicle. The tipper assembly includes a base configured to couple to a tailgate of the refuse vehicle and an actuator assembly comprising an actuator and a transmission device. The actuator may be coupled to the transmission device and may be configured to provide an input to the transmission device. The transmission device may be configured to reduce a speed of the input. The tipper assembly further includes an arm extending from and pivotally coupled to at least one of the actuator assembly or the base and an implement coupled to the arm. The implement may be configured to engage with a refuse container and facilitate the dumping of contents within the refuse container into an opening in the tailgate.

Another embodiment relates to a cycloidal drive transmission. The cycloidal drive transmission includes a first stage cycloidal drive, a second stage cycloidal drive, and an input shaft. The first stage cycloidal drive includes a first cycloidal disc defining a first aperture, a first plurality of ring pins, and a housing defining a first cavity. The first cycloidal disc and the first plurality of ring pins may be positioned within the first cavity. The second stage cycloidal drive includes a second cycloidal disc defining a second aperture, a second plurality of ring pins, and an annulus defining a second cavity. The second cycloidal disc and second plurality of ring pins may be positioned within the annulus. The input shaft may be configured to receive an input force from an actuator and may be configured to be received by the first aperture and the second aperture and to rotate about an input axis. The rotation of the input shaft at a first speed causes the rotation of the annulus at a second speed, wherein the second speed is less than the first speed.

Still another embodiment relates to a refuse vehicle. The refuse vehicle includes a chassis and a body assembly coupled to the chassis, and a tipper assembly. The body assembly defines a refuse compartment. The tipper assembly includes a base configured to couple to the refuse vehicle and an actuator assembly. The actuator assembly includes an actuator and a transmission device, the actuator may be coupled to the transmission device and configured to provide an input to the transmission device. The transmission device may be configured to reduce a speed of the input. The tipper assembly further includes an arm extending from and pivotally coupled to at least one of the actuator assembly or the base and an implement coupled to the arm. The implement may be configured to engage with a refuse container and facilitate dumping contents within the refuse container into the refuse compartment This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE DRAWINGS

FIG. 10 is a side view of the lift assembly of FIG. 9 in a first orientation, according to an exemplary embodiment.

FIG. 11 is a side view of the lift assembly of FIG. 9 in a second orientation, according to an exemplary embodiment.

FIGS. 14-16 show various gearboxes useable with the lift assembly of FIG. 13, according to various exemplary embodiments.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, a refuse vehicle includes a rear lift assembly coupled to a tailgate of the refuse vehicle. The rear lift assembly includes a base, an electric actuator coupled to the base, an implement, and an arm extending between the electric actuator and the implement such that the implement is pivotally coupled to the base. The electric actuator is configured to pivot the implement between a first position and a second position to facilitate emptying contents from a refuse container interfacing with the implement into a refuse compartment of the refuse vehicle through the tailgate.

Overall Vehicle

Figure 1:
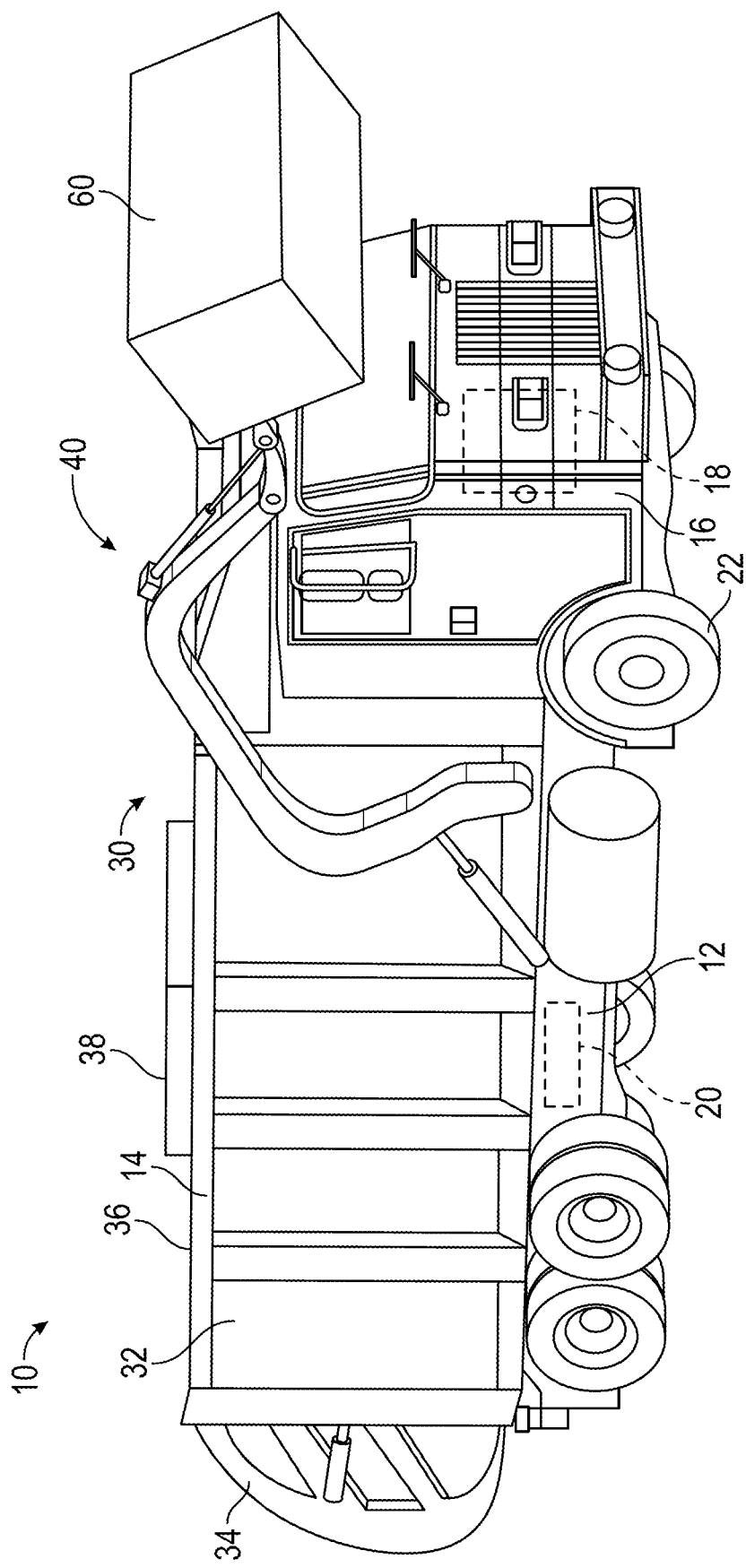
FIG. 1 is a front perspective view of a refuse vehicle, according to an exemplary embodiment.

As shown in FIG. 1, a vehicle, shown as refuse vehicle 10 (e.g., a garbage truck, a waste collection truck, a sanitation truck, a recycling truck, etc.), is configured as a front-loading refuse truck. In other embodiments, the refuse vehicle 10 is configured as a side-loading refuse truck or a rear-loading refuse truck (see, e.g., FIG. 2). In still other embodiments, the vehicle is another type of vehicle (e.g., a skid-loader, a telehandler, a plow truck, a boom lift, etc.). As shown in FIG. 1, the refuse vehicle 10 includes a chassis, shown as frame 12; a body assembly, shown as body 14, coupled to the frame 12 (e.g., at a rear end thereof, etc.); and a cab, shown as cab 16, coupled to the frame 12 (e.g., at a front end thereof, etc.). The cab 16 may include various components to facilitate operation of the refuse vehicle 10 by an operator (e.g., a seat, a steering wheel, actuator controls, a user interface, switches, buttons, dials, etc.).

As shown in FIG. 1, the refuse vehicle 10 includes a prime mover, shown as electric motor 18, and an energy system, shown as energy storage and/or generation system 20. In other embodiments, the prime mover is or includes an internal combustion engine. According to the exemplary embodiment shown in FIG. 1, the electric motor 18 is coupled to the frame 12 at a position beneath the cab 16. The electric motor 18 is configured to provide power to a plurality of tractive elements, shown as wheels 22 (e.g., via a drive shaft, axles, etc.). In other embodiments, the electric motor 18 is otherwise positioned and/or the refuse vehicle 10 includes a plurality of electric motors to facilitate independently driving one or more of the wheels 22. In still other embodiments, the electric motor 18 or a secondary electric motor is coupled to and configured to drive a hydraulic system that powers hydraulic actuators. According to the exemplary embodiment shown in FIG. 1, the energy storage and/or generation system 20 is coupled to the frame 12 beneath the body 14. In other embodiments, the energy storage and/or generation system 20 is otherwise positioned (e.g., within a tailgate of the refuse vehicle 10, beneath the cab 16, along the top of the body 14, within the body 14, etc.).

According to an exemplary embodiment, the energy storage and/or generation system 20 is configured to (a) receive, generate, and/or store power and (b) provide electric power to (i) the electric motor 18 to drive the wheels 22, (ii) electric actuators of the refuse vehicle 10 to facilitate operation thereof (e.g., lift actuators, tailgate actuators, packer actuators, grabber actuators, etc.), and/or (iii) other electrically operated accessories of the refuse vehicle 10 (e.g., displays, lights, etc.). The energy storage and/or generation system 20 may include one or more rechargeable batteries (e.g., lithium-ion batteries, nickel-metal hydride batteries, lithium-ion polymer batteries, lead-acid batteries, nickel-cadmium batteries, etc.), capacitors, solar cells, generators, power buses, etc. In one embodiment, the refuse vehicle 10 is a completely electric refuse vehicle. In other embodiments, the refuse vehicle 10 includes an internal combustion generator that utilizes one or more fuels (e.g., gasoline, diesel, propane, natural gas, hydrogen, etc.) to generate electricity to charge the energy storage and/or generation system 20, power the electric motor 18, power the electric actuators, and/or power the other electrically operated accessories (e.g., a hybrid refuse vehicle, etc.). For example, the refuse vehicle 10 may have an internal combustion engine augmented by the electric motor 18 to cooperatively provide power to the wheels 22. The energy storage and/or generation system 20 may thereby be charged via an on-board generator (e.g., an internal combustion generator, a solar panel system, etc.), from an external power source (e.g., overhead power lines, mains power source through a charging input, etc.), and/or via a power regenerative braking system, and provide power to the electrically operated systems of the refuse vehicle 10. In some embodiments, the energy storage and/or generation system 20 includes a heat management system (e.g., liquid cooling, heat exchanger, air cooling, etc.).

According to an exemplary embodiment, the refuse vehicle 10 is configured to transport refuse from various waste receptacles within a municipality to a storage and/or processing facility (e.g., a landfill, an incineration facility, a recycling facility, etc.). As shown in FIG. 1, the body 14 includes a plurality of panels, shown as panels 32, a tailgate 34, and a cover 36. The panels 32, the tailgate 34, and the cover 36 define a collection chamber (e.g., hopper, etc.), shown as refuse compartment 30. Loose refuse may be placed into the refuse compartment 30 where it may thereafter be compacted (e.g., by a packer system, etc.). The refuse compartment 30 may provide temporary storage for refuse during transport to a waste disposal site and/or a recycling facility. In some embodiments, at least a portion of the body 14 and the refuse compartment 30 extend above or in front of the cab 16. According to the embodiment shown in FIG. 1, the body 14 and the refuse compartment 30 are positioned behind the cab 16. In some embodiments, the refuse compartment 30 includes a hopper volume and a storage volume. Refuse may be initially loaded into the hopper volume and thereafter compacted into the storage volume. According to an exemplary embodiment, the hopper volume is positioned between the storage volume and the cab 16 (e.g., refuse is loaded into a position of the refuse compartment 30 behind the cab 16 and stored in a position further toward the rear of the refuse compartment 30, a front-loading refuse vehicle, a side-loading refuse vehicle, etc.). In other embodiments, the storage volume is positioned between the hopper volume and the cab 16 (e.g., a rear-loading refuse vehicle, etc.).

As shown in FIG. 1, the refuse vehicle 10 includes a lift mechanism/system (e.g., a front-loading lift assembly, etc.), shown as lift assembly 40, coupled to the front end of the body 14. In other embodiments, the lift assembly 40 extends rearward of the body 14 (e.g., a rear-loading refuse vehicle, etc.). In still other embodiments, the lift assembly 40 extends from a side of the body 14 (e.g., a side-loading refuse vehicle, etc.). As shown in FIG. 1, the lift assembly 40 is configured to engage a container (e.g., a residential trash receptacle, a commercial trash receptacle, a container having a robotic grabber arm, etc.), shown as refuse container 60. The lift assembly 40 may include various actuators (e.g., electric actuators, hydraulic actuators, pneumatic actuators, etc.) to facilitate engaging the refuse container 60, lifting the refuse container 60, and tipping refuse out of the refuse container 60 into the hopper volume of the refuse compartment 30 through an opening in the cover 36 or through the tailgate 34. The lift assembly 40 may thereafter return the empty refuse container 60 to the ground. According to an exemplary embodiment, a door, shown as top door 38, is movably coupled along the cover 36 to seal the opening thereby preventing refuse from escaping the refuse compartment 30 (e.g., due to wind, bumps in the road, etc.).

Rear-Loading Lift Assembly

Figure 2:
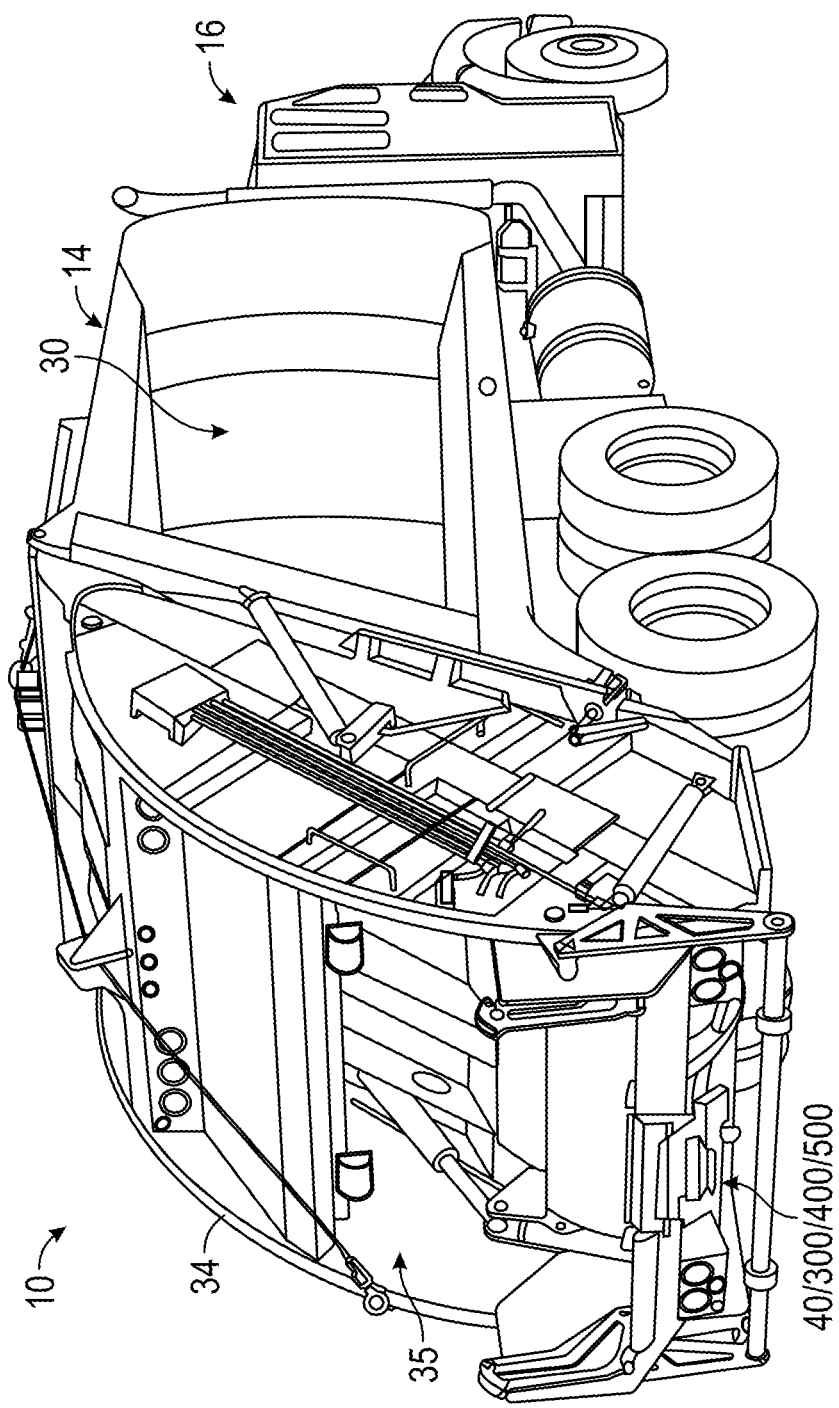
FIG. 2 is a rear perspective of the refuse vehicle of FIG. 1 having a rear lift assembly, according to an exemplary embodiment.

As shown in FIG. 2, the lift assembly 40 is configured as a rear-loading lift assembly. According to an exemplary embodiment shown in FIG. 2, the lift assembly 40 is configured to facilitate lifting the refuse container 60 to dump the contents therein (e.g., trash, recyclables, etc.) into the refuse compartment 30 through an opening, shown as hopper opening 35, in the tailgate 34.

As shown in FIGS. 3-6, the rear-loading lift assembly is a first lift assembly (e.g., a tipper assembly, etc.), shown as lift assembly 300. As shown in FIGS. 3-6, the lift assembly 300 includes a base, shown as base plate 302, having first supports, shown as supports 304, extending therefrom and second supports, shown as supports 306, extending therefrom and positioned at opposing ends of the base plate 302. According to an exemplary embodiment, the base plate 302 is configured to facilitate coupling the lift assembly 300 to the tailgate 34 of the refuse vehicle 10.

Figure 3:
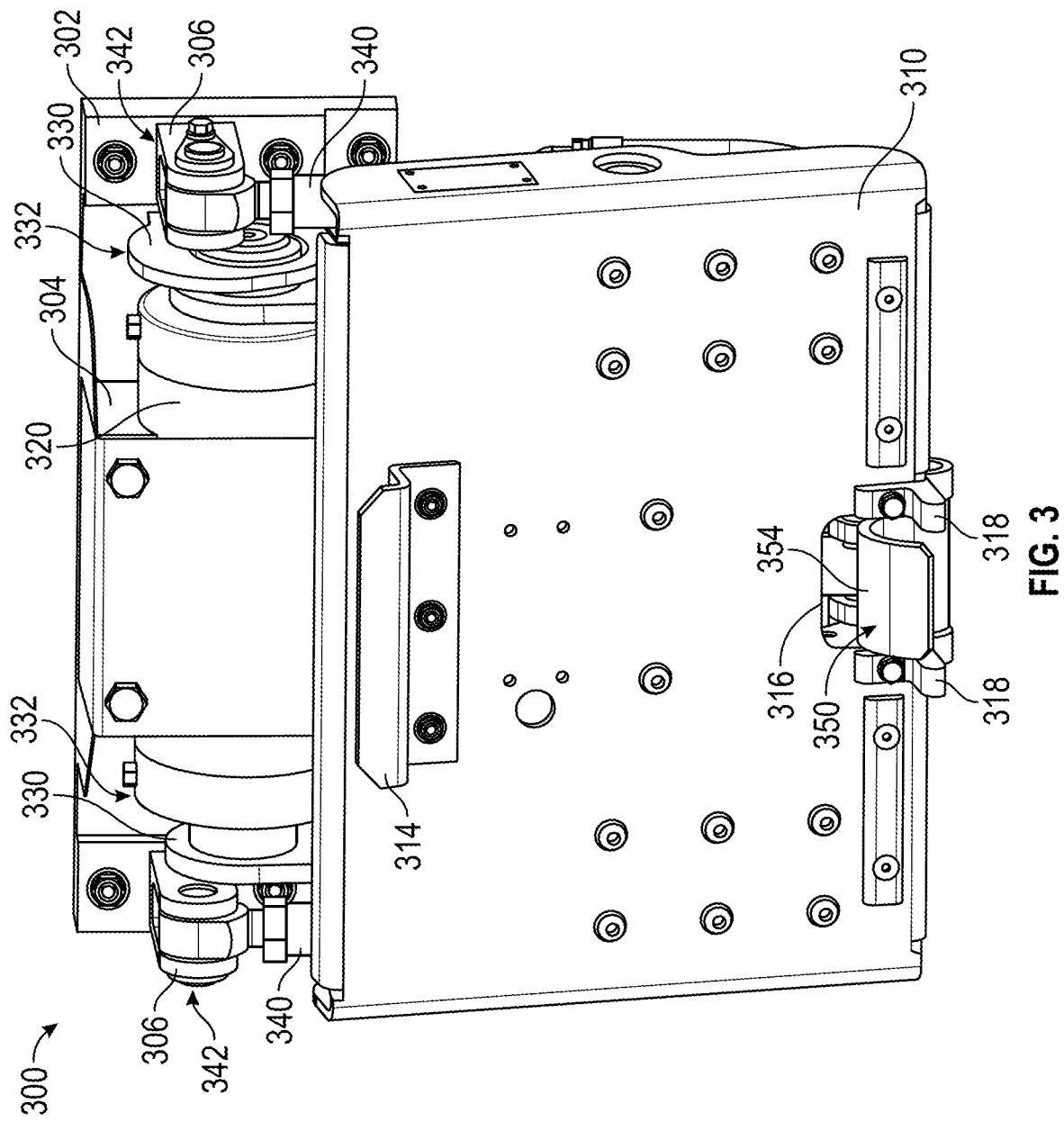
FIG. 3 is a front perspective view of the lift assembly of FIG. 2 in a first orientation, according to an exemplary embodiment.
Figure 4:
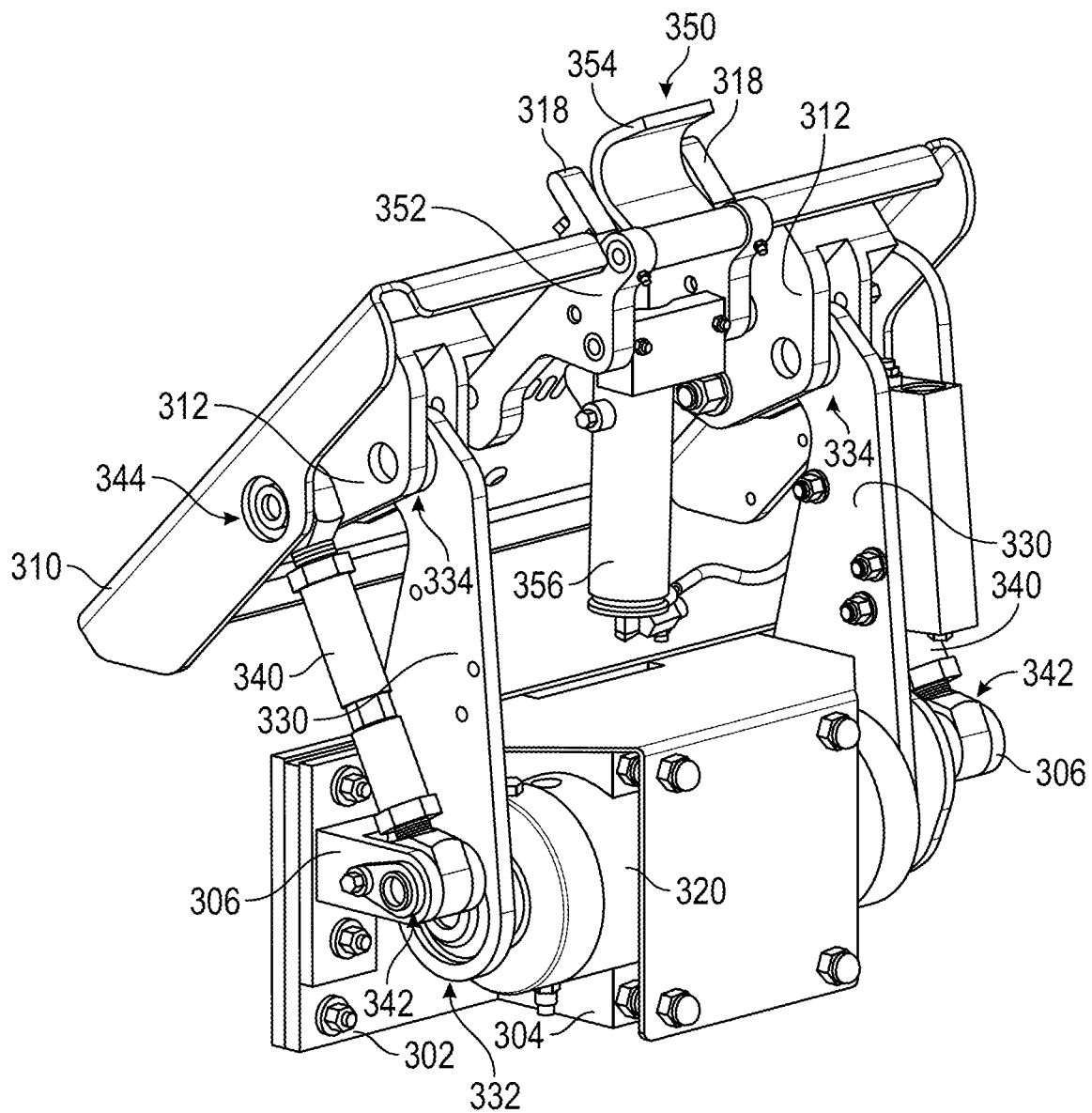
FIG. 4 is a front perspective view of the lift assembly of FIG. 3 in a second orientation, according to an exemplary embodiment.
Figure 5:
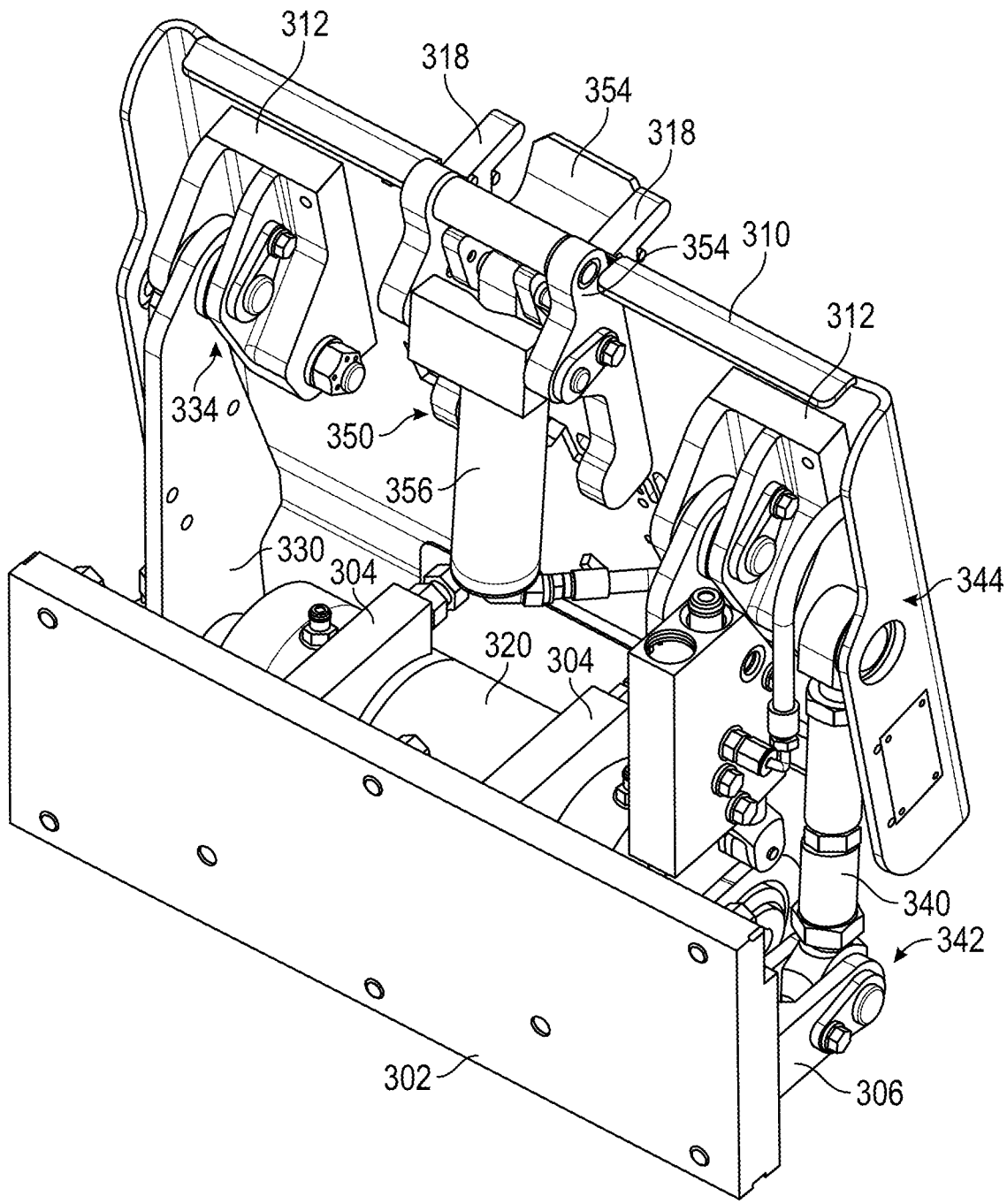
FIG. 5 is a bottom, rear perspective view of the lift assembly of FIG. 3, according to an exemplary embodiment.
Figure 6:
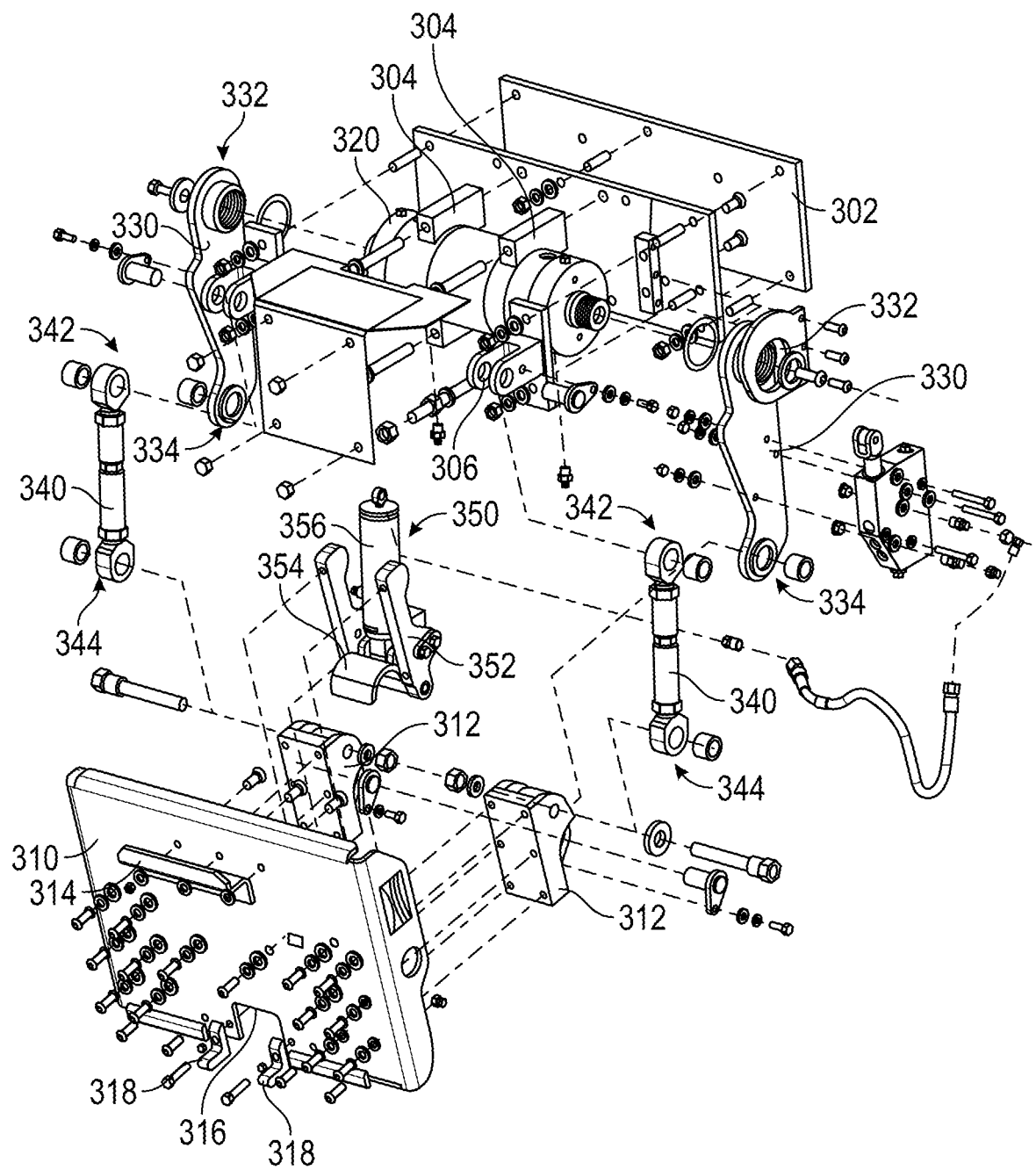
FIG. 6 is an exploded view of the lift assembly of FIG. 3, according to an exemplary embodiment.

As shown in FIGS. 3-6, the lift assembly 300 includes an implement, shown as engagement plate 310. As shown in FIGS. 4-6, the engagement plate 310 has a pair of brackets, shown as coupling brackets 312, disposed along a rear surface thereof. As shown in FIGS. 3 and 6, the engagement plate 310 includes a first interface, shown as upper retainer 314, disposed along a front surface thereof. As shown in FIGS. 3 and 6, the engagement plate 310 defines a notch, shown as cutout 316, along a bottom edge thereof and in alignment with the upper retainer 314. As shown in FIGS. 3-6, the engagement plate 310 includes a second interface, shown as lower retainers 318, disposed along the bottom edge thereof on each side of the cutout 316.

As shown in FIGS. 3-6, the lift assembly 300 includes a first actuator, shown as pivot actuator 320, coupled to the supports 304 of the base plate 302. According to an exemplary embodiment, the pivot actuator 320 is an electric actuator configured to be powered via electricity provided by the energy storage and/or generation system 20 or another electrical source on the refuse vehicle 10 (e.g., a generator, solar panels, etc.). According to the exemplary embodiment shown in FIGS. 3-6, the pivot actuator 320 is a rotational electric actuator (e.g., an electric motor, etc.). In some embodiments, the pivot actuator 320 is a linear electric actuator (e.g., a ball screw linear actuator driven by an electric motor, a lead screw actuator driven by an electric motor, etc.). In an alternative embodiment, the pivot actuator 320 is a fluidly operated actuator (e.g., a hydraulic cylinder, a hydraulic rotary actuator, a pneumatic cylinder, a pneumatic rotary vane, etc.) operated by a fluid pump (e.g., a hydraulic pump, a pneumatic pump, etc.) driven by an electric motor (e.g., the electric motor 18, the secondary electric motor, an integrated motor of the fluid pump, etc.) (see, e.g., FIGS. 20-22).

As shown in FIGS. 3-6, the lift assembly 300 includes a first pair of arms, shown as rotational arms 330. Each of the rotational arms 330 includes (i) a first end, shown as base end 332, pivotally coupled to a respective end of the pivot actuator 320 and (ii) an opposing second end, shown as implement end 334, pivotally coupled to a respective one of the coupling brackets 312 disposed along the rear surface of the engagement plate 310, thereby coupling the engagement plate 310 to the pivot actuator 320. According to the exemplary embodiment shown in FIGS. 3 and 4, the base ends 332 of the rotational arms 330 are directly coupled to the pivot actuator 320. In other embodiments, the lift assembly 300 includes a gear arrangement or transmission device (e.g., an inline transmission device, a planetary or epicyclic gearbox, a cycloidal drive, a harmonic drive, an intermediary transmission device, eccentric gearing, parallel axis gearing, a double-reduction worm gear assembly, etc.) positioned between the pivot actuator 320 and the rotational arms 330. According to an exemplary embodiment, the lift assembly may include a cycloidal drive transmission device 700 as discussed in detail below with reference to FIGS. 26-32.

As shown in FIGS. 3-6, the lift assembly 300 includes a second pair of arms, shown as idler arms 340. Each of the idler arms 340 includes (i) a first end, shown as base end 342, pivotally coupled to a respective one of the supports 306 disposed along the base plate 302, and (ii) an opposing second end, shown as implement end 344, pivotally coupled to a respective one of the coupling brackets 312 disposed along the rear surface of the engagement plate 310. According to an exemplary embodiment, the length of the idler arms 340 is selectively adjustable (e.g., increased, decreased, etc.) to modify an angle of the engagement plate 310 relative to the base plate 302 (e.g., tilt the engagement plate 310 forward, backward, etc.).

As shown in FIGS. 3-6, the lift assembly 300 includes a locking system, shown as locking assembly 350. As shown in FIGS. 4-6, the locking assembly 350 includes a coupler, shown as locking assembly bracket 352, coupled to the rear surface of the engagement plate 310, proximate the cutout 316. As shown in FIGS. 3-6, the locking assembly 350 includes a movable retainer, shown as clamp 354, pivotally coupled to the locking assembly bracket 352 and positioned such that the clamp 354 extends through the cutout 316 of the engagement plate 310. As shown in FIGS. 4-6, the locking assembly 350 includes a second actuator, shown as locking actuator 356, coupled to the locking assembly bracket 352 and positioned to facilitate selectively locking the clamp 354 in place to prevent rotation thereof. According to an exemplary embodiment, the locking actuator 356 is an electric actuator configured to be powered via electricity provided by the energy storage and/or generation system 20 or another electrical source on the refuse vehicle 10 (e.g., a generator, solar panels, etc.). According to an exemplary embodiment, the locking actuator 356 is a linear actuator configured to extend and retract to selectively, pivotally fix the clamp 354 in place. In one embodiment, the locking actuator 356 is or includes a ball screw driven by an electric motor (e.g., a linear, mechanical actuator, etc.). In other embodiments, another type of electrically driven, linear actuator is used (e.g., a lead screw actuator, etc.). In another embodiment, the locking actuator 356 is a rotational actuator. In an alternative embodiment, the locking actuator 356 is a fluidly operated actuator (e.g., a hydraulic cylinder, a pneumatic cylinder, a pneumatic rotary vane, etc.) operated by a fluid pump (e.g., a hydraulic pump, a pneumatic pump, etc.) driven by an electric motor (e.g., the electric motor 18, the secondary electric motor, an integrated motor of the fluid pump, etc.).

According to an exemplary embodiment, the pivot actuator 320 is selectively controllable to pivot the engagement plate 310 between a first position or base position, as shown in FIG. 3, and a second position or dump position, as shown in FIG. 4. According to an exemplary embodiment, the upper retainer 314 and the lower retainers 318 are configured to engage a first interface (e.g., a lip, etc.) and a second interface (e.g., a bar, etc.), respectively, of the refuse container 60 when the engagement plate 310 is in the base position. The clamp 354 may freely pivot and lie on top of the second interface when the engagement plate 310 is in the base position such that the second interface is positioned between the lower retainers 318 and the clamp 354. However, the locking actuator 356 may be configured to lock the clamp 354 in place when the pivot actuator 320 pivots the engagement plate 310 into the dump position (e.g., immediately once the pivot actuator 320 is activated, once the engagement plate 310 reaches a predetermined angle, etc.). Such locking of the clamp 354 may thereby prevent the refuse container 60 from dislodging from the engagement plate 310 when pivoted to empty the contents within the refuse container 60. The locking actuator 356 may thereafter be configured to unlock the clamp 354 in response to the pivot actuator 320 returning the engagement plate 310 to the initial, base position (e.g., once the engagement plate 310 is no longer in motion, once the engagement plate 310 reaches a predefined angle, etc.) so that the refuse container 60 can be removed from the engagement plate 310 by an operator.

Figure 8:
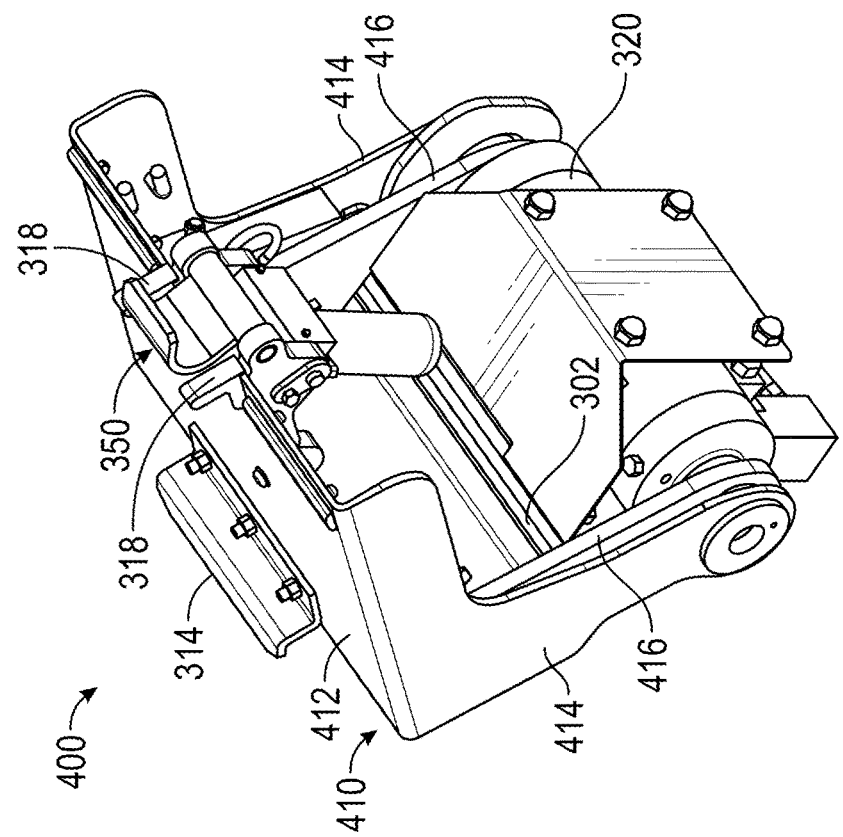
FIG. 8 is a front perspective view of the lift assembly of FIG. 7 in a second orientation, according to an exemplary embodiment.
Figure 7:
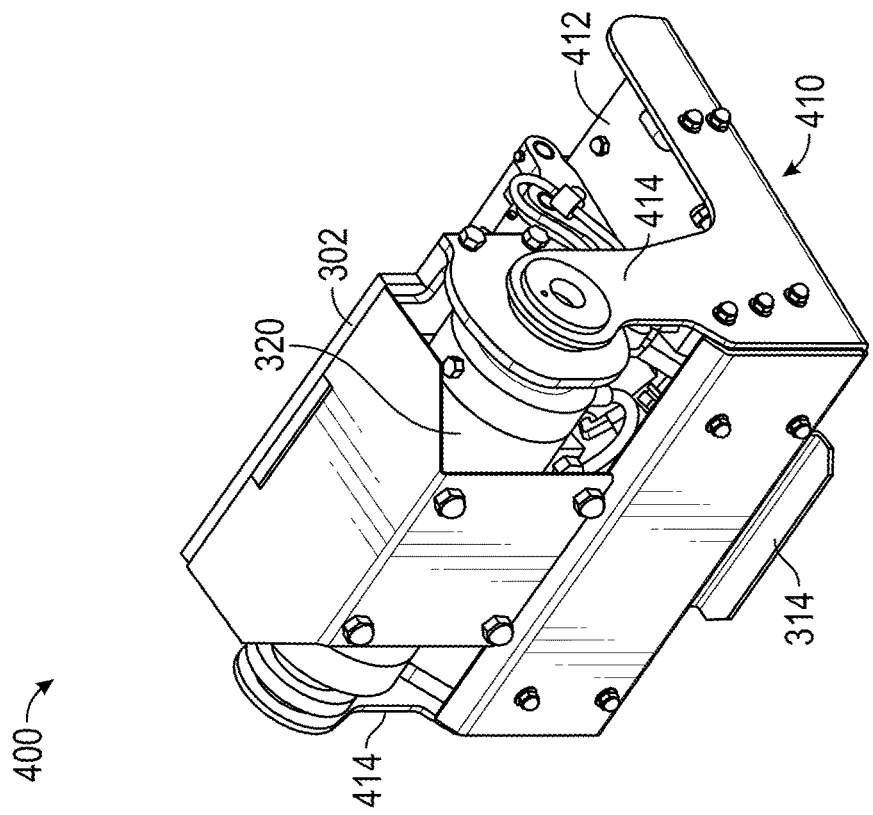
FIG. 7 is a front perspective view of the lift assembly of FIG. 2 in a first orientation, according to another exemplary embodiment.

As shown in FIGS. 7 and 8, the rear-loading lift assembly is a second lift assembly (e.g., a tipper assembly, etc.), shown as lift assembly 400. The lift assembly 400 may be similar to the lift assembly 300 except the engagement plate 310, the rotational arms 330, and the idler arms 340 may be replaced with a unitary structure, shown as implement 410. As shown in FIGS. 7 and 8, the implement 410 includes a front plate, shown as engagement plate 412, having a first pair of arms, shown as outer arms 414, extending from and integrally formed with the engagement plate 412. The outer arms 414 are coupled to the pivot actuator 320 such that the engagement of the pivot actuator 320 facilitates selectively pivoting the outer arms 414 and, thereby, the engagement plate 412 therewith, between the base position, as shown in FIG. 7, and the dump position, as shown in FIG. 8. As shown in FIG. 8, the implement 410 includes a second pair of arms, shown as inner arms 416, spaced from and positioned between the outer arms 414. According to an exemplary embodiment, the inner arms 416 extend from and are integrally formed with the engagement plate 412. As shown in FIG. 8, the inner arms 416 are coupled to the pivot actuator 320. The inner arms 416 may, therefore, provide extra support and stability to the implement 410. In some embodiments, the implement 410 does not includes the inner arms 416.

Figure 9:
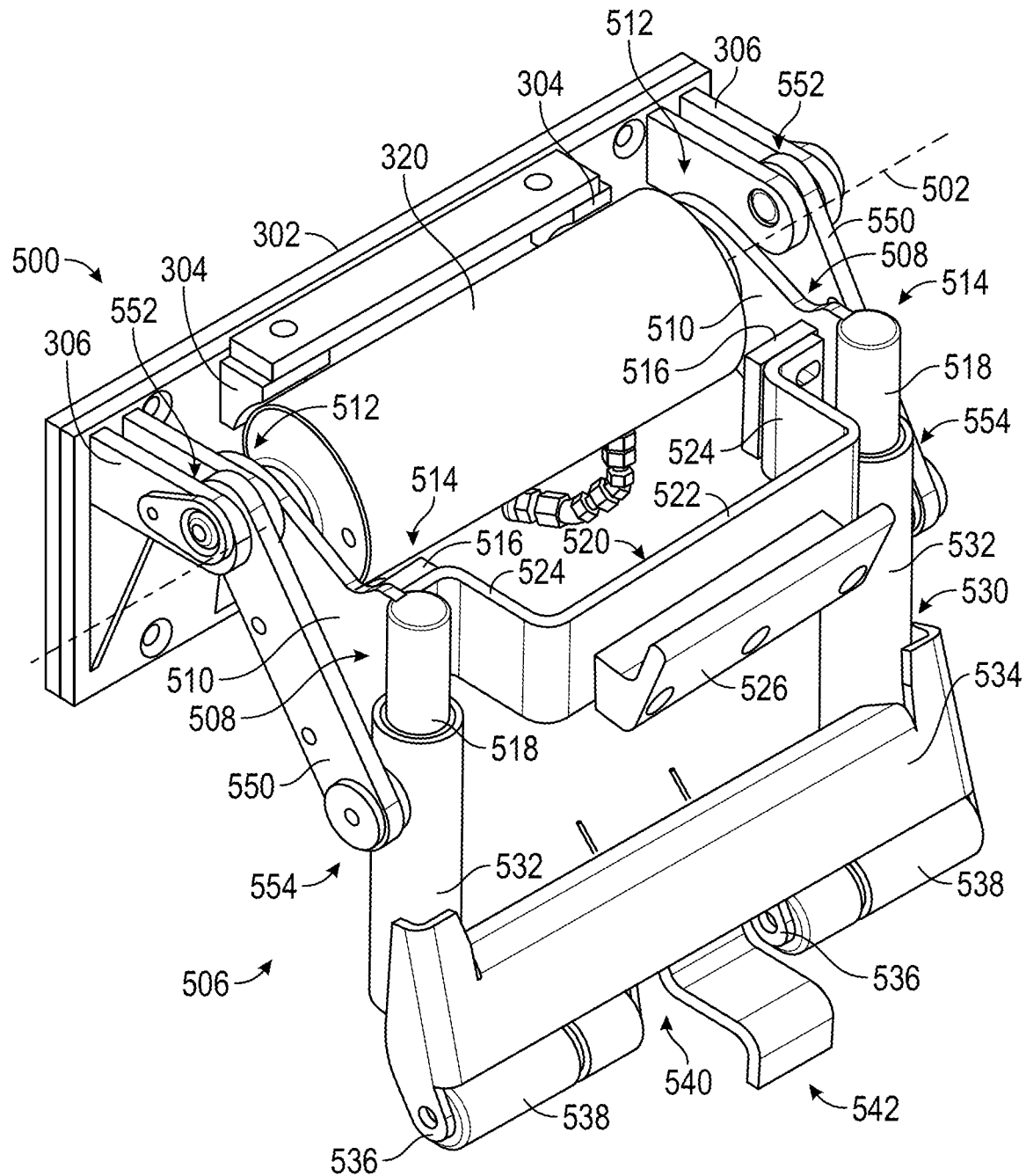
FIG. 9 is a front perspective view of the lift assembly of FIG. 2, according to still another exemplary embodiment.

As shown in FIGS. 9-11, the rear-loading lift assembly is a third lift assembly (e.g., a tipper assembly, etc.), shown as lift assembly 500. The lift assembly 500 may be similar to the lift assembly 300 except as identified below. As shown in FIGS. 9-11, the lift assembly 500 includes an implement, shown as tipper implement 506, coupled to the base plate 302 and the pivot actuator 320. According to an exemplary embodiment, the tipper implement 506 is configured to selectively engage the refuse container 60. The pivot actuator 320 is then configured to pivot the tipper implement 506 and the refuse container 60 about an axis, shown pivot axis 502, to facilitate dumping the contents within the refuse container 60 (e.g., trash, recyclables, etc.) into the refuse compartment 30 through the hopper opening 35 in the tailgate 34 of the refuse vehicle 10.

As shown in FIGS. 9-11, the tipper implement 506 of the lift assembly 500 includes a first pair of arms, shown as pivot arms 508, pivotally coupled to the pivot actuator 320; a first engagement assembly, shown as upper engagement assembly 520, coupled to the pivot arms 508; a second engagement assembly, shown as lower engagement assembly 530, coupled to the pivot arms 508; and a second pair of arms, shown as support arms 550, extending between the base plate 302 and the lower engagement assembly 530.

As shown in FIG. 9-11, each of the pivot arms 508 include a plate, shown as arm plate 510, having (i) a first end, shown as base end 512, pivotally coupled to a respective end of the pivot actuator 320 and (ii) an opposing second end, shown as implement end 514, coupled the upper engagement assembly 520 and the lower engagement assembly 530. According to the exemplary embodiment shown in FIG. 9, the base ends 512 of the pivot arms 508 are directly coupled to opposing sides of the pivot actuator 320. As shown in FIG. 9, each of the pivot arms 508 includes an interface, shown as support plate 516, positioned between the base end 512 and the implement end 514 of each of the arm plates 510 and extending inward from an inner surface thereof. As shown in FIGS. 9-11, each of the pivot arms 508 includes an extension, shown as rod 518, extending downward from the implement end 514 of each of the arm plates 510.

As shown in FIGS. 9-11, the upper engagement assembly 520 includes a first bracket, shown as upper engagement bracket 522. As shown in FIG. 9, the upper engagement bracket 522 has (i) flanges, shown as coupling flanges 524, extending from opposing ends of the upper engagement bracket 522 that are configured to interface with the support plates 516 of the pivot arms 508 to couple the upper engagement bracket 522 to the pivot arms 508. As shown in FIGS. 9-11, the upper engagement assembly 520 includes a first retainer, shown as upper retainer 526, disposed along a front surface of the upper engagement bracket 522.

As shown in FIGS. 9-11, the lower engagement assembly 530 includes a pair of receivers, shown as cylinders 532, having upper ends that receive the rods 518 of the upper engagement assembly 520, and a second bracket, shown as lower engagement bracket 534, extending between lower ends of the cylinders 532. The lower engagement bracket 534 includes a plurality of interfaces, shown as roller interfaces 536, extending from a bottom edge thereof. The roller interfaces 536 facilitate rotationally coupling a plurality of rollers, shown as rollers 538, to the lower engagement bracket 534 proximate each lateral end of the lower engagement bracket 534 and spaced from each other such that a gap, shown as retainer gap 540, if formed therebetween. The lower engagement bracket 534 further includes a second retainer, shown as lower retainer 542, positioned within the retainer gap 540 and extending from the bottom edge of the lower engagement bracket 534.

As shown in FIGS. 9-11, each of the support arms 550 includes (i) a first end, shown as base end 552, pivotally coupled to a respective one of the supports 306 disposed along the base plate 302 and (ii) an opposing second end, shown as implement end 554, pivotally coupled to the upper end of a respective one of the cylinders 532 of the lower engagement assembly 530.

As shown in FIGS. 10 and 11, the pivot arms 508 are coupled to the pivot actuator 320 such that the engagement of the pivot actuator 320 facilitates selectively pivoting the pivot arms 508 about the pivot axis 502 and, thereby, the upper engagement assembly 520, the lower engagement assembly 530, and the support arms 550 therewith between the base position, as shown in FIG. 10, and the dump position, as shown in FIG. 11. According to the exemplary embodiment shown in FIGS. 10 and 11, the rods 518 of the upper engagement assembly 520 and the cylinders 532 of the lower engagement assembly 530 translate relative to each other (i.e., the rods 518 slide in and out of the cylinders 532) as the tipper implement 506 is pivoted between the base position and the dump position. Specifically, (i) as shown in FIG. 10, the upper retainer 526 of the upper engagement assembly 520 is spaced a first distance $d_1$ from the lower retainer 542 of the lower engagement assembly 530 when the tipper implement 506 is in the base position and (ii) as shown in FIG. 11, the upper retainer 526 of the upper engagement assembly 520 is spaced a second, longer distance $d_2$ from the lower retainer 542 of the lower engagement assembly 530 when the tipper implement 506 is in the dump position. According to an exemplary embodiment, only the upper retainer 526 is configured to engage a first, upper interface (e.g., a lip, etc.) of the refuse container 60 when the tipper implement 506 is in the base position. Then, as the tipper implement 506 is pivoted about the pivot axis 502 from the base position toward the dump position, the upper retainer 526 and the lower retainer 542 will begin to separating further apart from each other until the lower retainer 542 engages a second, lower interface (e.g., a bar, etc.) of the refuse container 60, thereby securing the refuse container 60 to the tipper implement 506.

Figure 12:
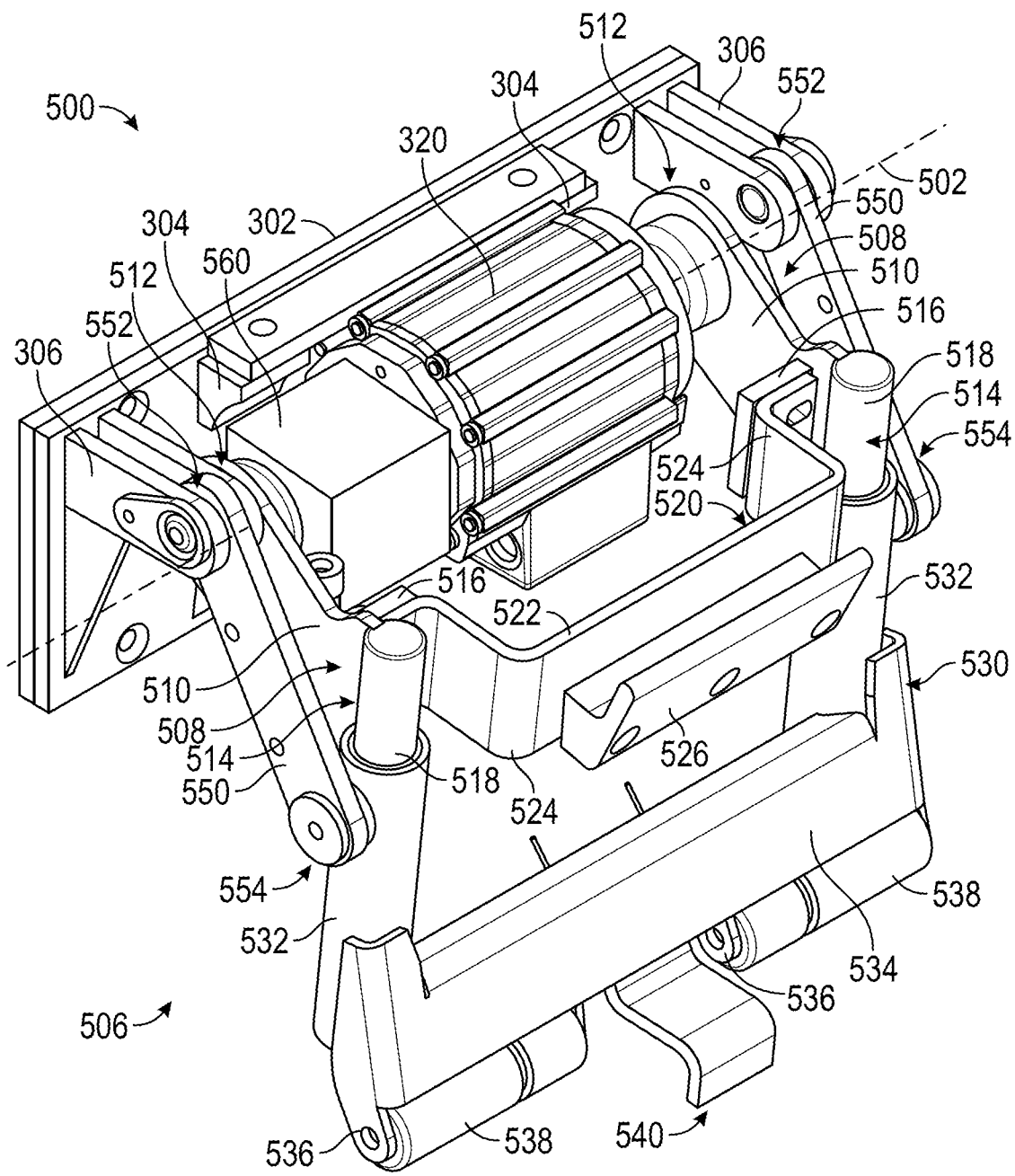
FIG. 12 is a front perspective view of the lift assembly of FIG. 9, according to another exemplary embodiment.

As shown in FIG. 12, the lift assembly 500 includes a first transmission device, shown as inline transmission device 560, positioned along the pivot axis 502 (e.g., an in-line arrangement, etc.) between the pivot actuator 320 and at least one of the pivot arms 508. The pivot actuator 320, thereby, indirectly drives the motion of the pivot arms 508 and the tipper implement 506 through the inline transmission device 560. In some embodiments, the inline transmission device 560 is or includes a planetary or an epicyclic gearbox. In some embodiments, the inline transmission device 560 is or includes a cycloidal drive transmission device 700, as is described in detail below with reference to FIGS. 26-32. In some embodiments, the inline transmission device 560 is or includes a harmonic drive. It should be understood that the inline transmission device 560 could similarly be implemented with the lift assembly 300 and/or the lift assembly 400.

Figure 13:
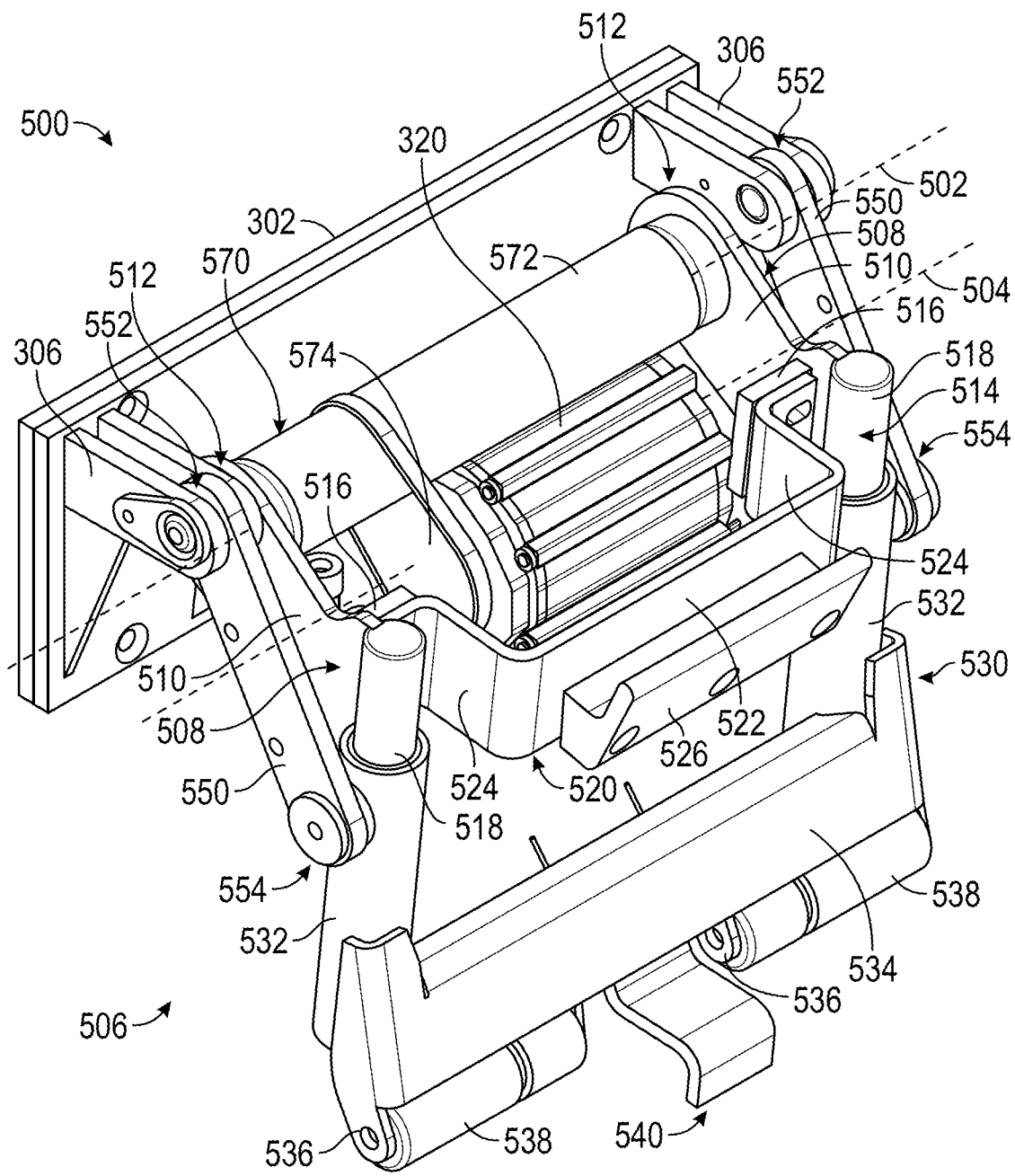
FIG. 13 is a front perspective view of the lift assembly of FIG. 9, according to still another exemplary embodiment.

As shown in FIG. 13, the lift assembly 500 includes a second transmission device, shown as offset transmission device 570, positioned between the pivot actuator 320 and at least one of the pivot arms 508. Specifically, the pivot actuator 320 is coupled to the base plate 302 and positioned offset from the pivot axis 502 along a second axis, shown as offset axis 504, that is parallel to the pivot axis 502 (e.g., a parallel arrangement, etc.). The pivot actuator 320, thereby, indirectly drives the motion of the motion of the pivot arms 508 and the tipper implement 506 through the offset transmission device 570. As shown in FIG. 13, the offset transmission device 570 includes (i) a shaft, shown as pivot shaft 572, extending along the pivot axis 502 and between the base ends 512 of the pivot arms 508 and (ii) an intermediary connector, shown as connector 574, rotationally coupling the pivot actuator 320 to the pivot shaft 572. In some embodiments, the offset transmission device 570 does not include the pivot shaft 572. Rather, the connector 574 may be directly coupled to the base end 512 of one of the pivot arms 508. Alternatively, the connector 574 may include (i) a first connector that extends between a first output of the pivot actuator 320 and a first pivot arm 508 and (ii) a second connector that extends between a second output of the pivot actuator 320 and a second pivot arm 508.

In some embodiments, the connector 574 is or includes a gearbox. In some embodiments, the connector 574 is or includes a belt or chain assembly. As shown in FIG. 14, the connector 574 includes an eccentric gearing gearbox 576 having (i) an input gear 578 configured to couple to an output of the pivot actuator 320, (ii) an output gear 580 configured to couple to the pivot shaft 572 (or directly to one of the pivot arms 508), and (iii) an intermediary gear 582 positioned between the input gear 578 and the output gear 580 and offset from the rotational axes thereof. As shown in FIG. 15, the connector 574 includes a parallel axis gearing gearbox 584 having (i) the input gear 578 and the output gear 580 directly coupled to the input gear 578. As shown in FIG. 16, the connector 574 includes a double-reduction worm gear gearbox 586. It should be understood that the offset transmission device 570 could similarly be implemented with the lift assembly 300 and/or the lift assembly 400.

Figure 17:
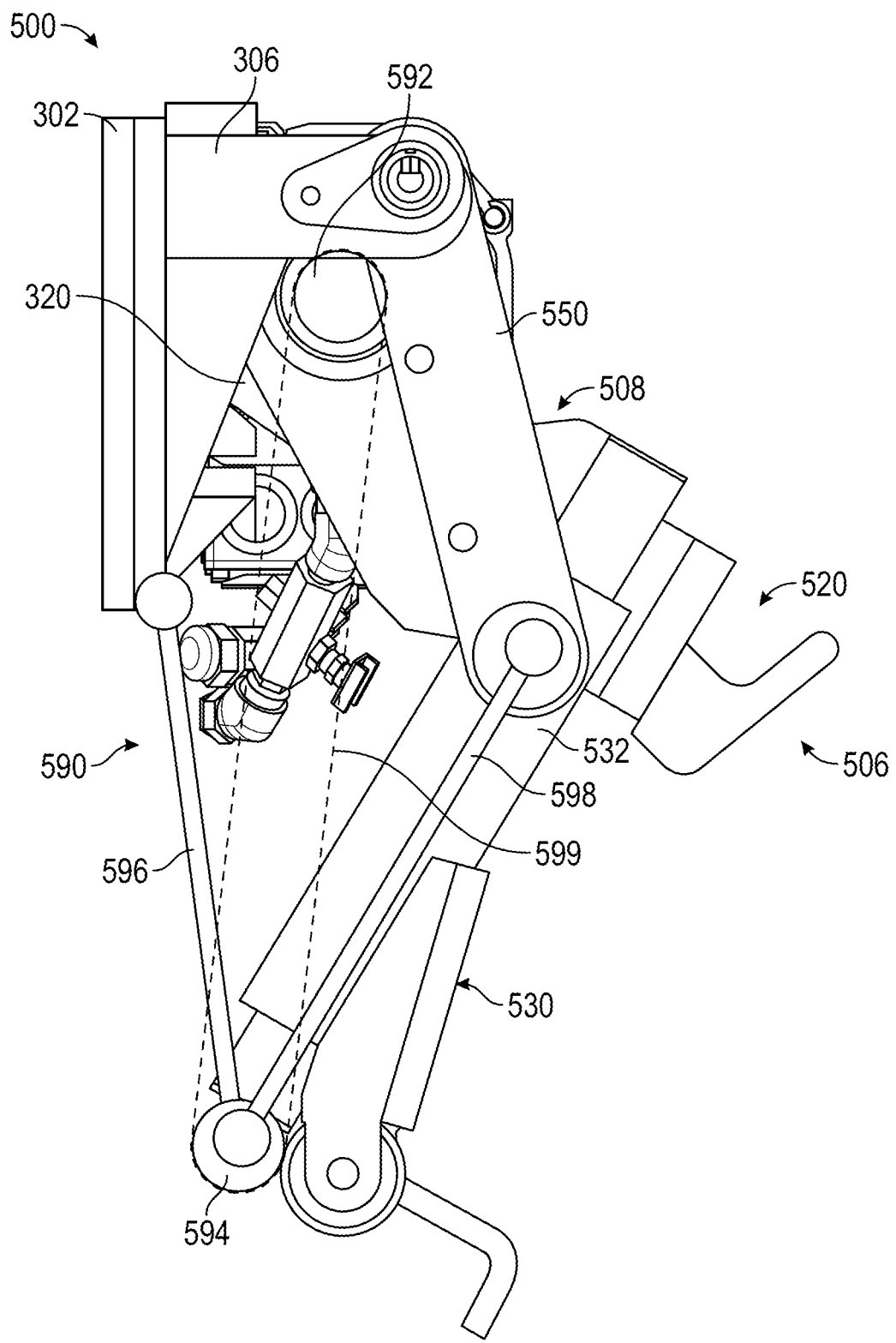
FIG. 17 is a side view of the lift assembly of FIG. 2 in a first orientation, according to yet another exemplary embodiment.
Figure 18:
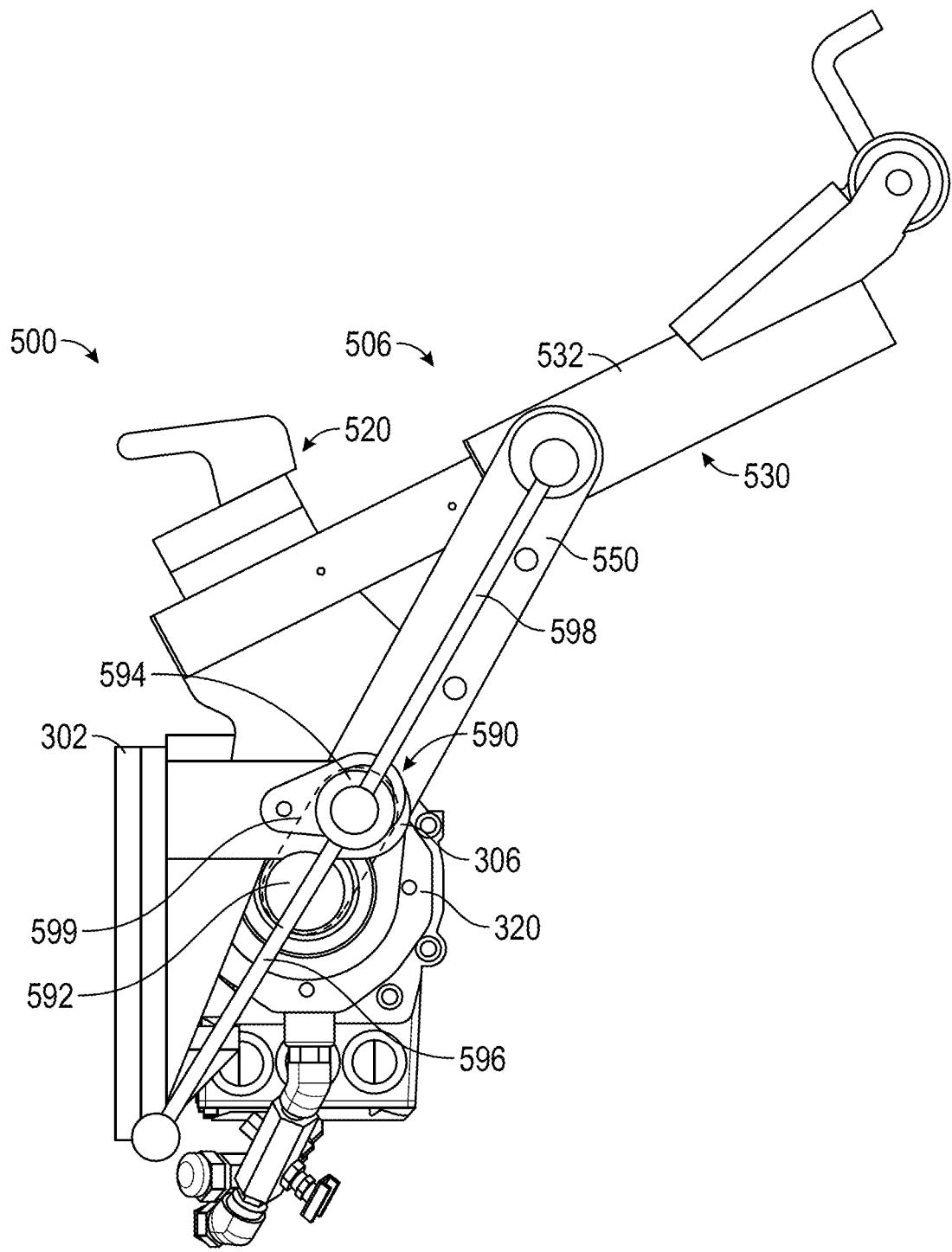
FIG. 18 is a side view of the lift assembly of FIG. 17 in a second orientation, according to an exemplary embodiment.

As shown in FIGS. 17 and 18, the lift assembly 500 includes a linkage system, shown as linkage assembly 590, having a first pulley, shown as motor pulley 592, fixed to the output of the pivot actuator 320; a second pulley, shown as traveling pulley 594; a first linkage, shown as link 596, extending between a pivot at the bottom of the base plate 302 and the traveling pulley 594; a second linkage, shown as link 598, extending between the traveling pulley 594 and the lower engagement assembly 530 (e.g., the interior side of a respective one of the cylinders 532, etc.); and a cable, shown as looped cable 599, extending around the motor pulley 592 and the traveling pulley 594. In some embodiments, the lift assembly 500 includes a pair of linkage assemblies 590, one on each side of the pivot actuator 320. In some embodiments, the pivot arms 508 are directly, pivotally coupled to the base plate 302, rather than the pivot actuator 320, when the lift assembly 500 includes the linkage assembly 590. According to the exemplary embodiment shown in FIGS. 17 and 18, the pivot actuator 320 drives the motor pulley 592, which winds the looped cable 599 around the motor pulley 592, thereby pulling on the traveling pulley 594, which causes the link 596 and the link 598 to pivot and drive the tipper implement 506 from the base position to the dump position. It should be understood that the linkage assembly 590 could similarly be implemented with the lift assembly 300 and/or the lift assembly 400.

Figure 19:
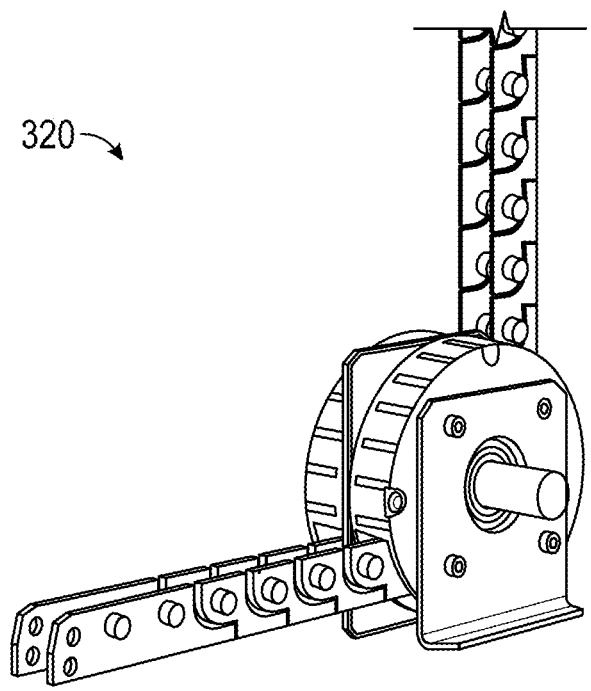
FIGS. 19-22 show various types of actuators usable with the lift assembly of FIG. 2 other than an electric motor, according to various exemplary embodiments.
Figure 20:
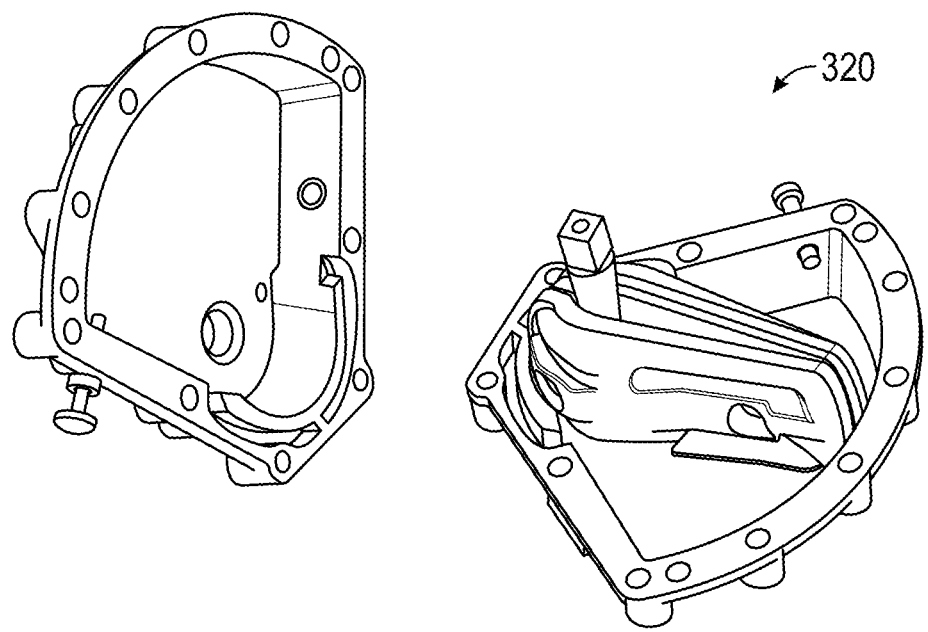
Figure 22:
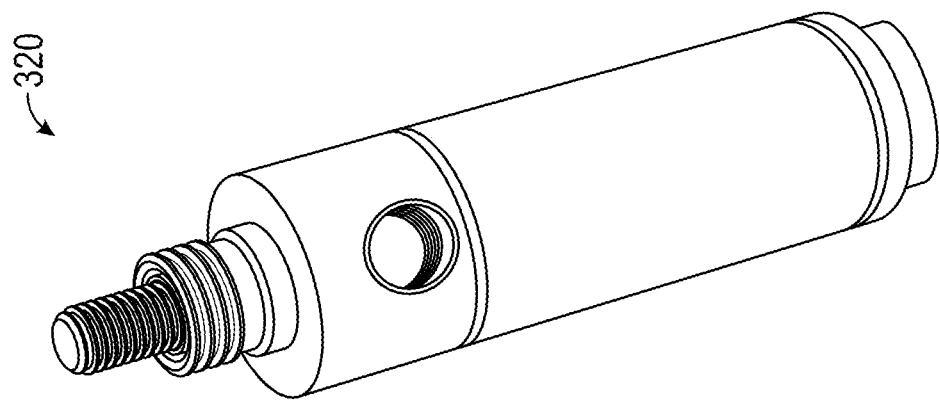
Figure 21:
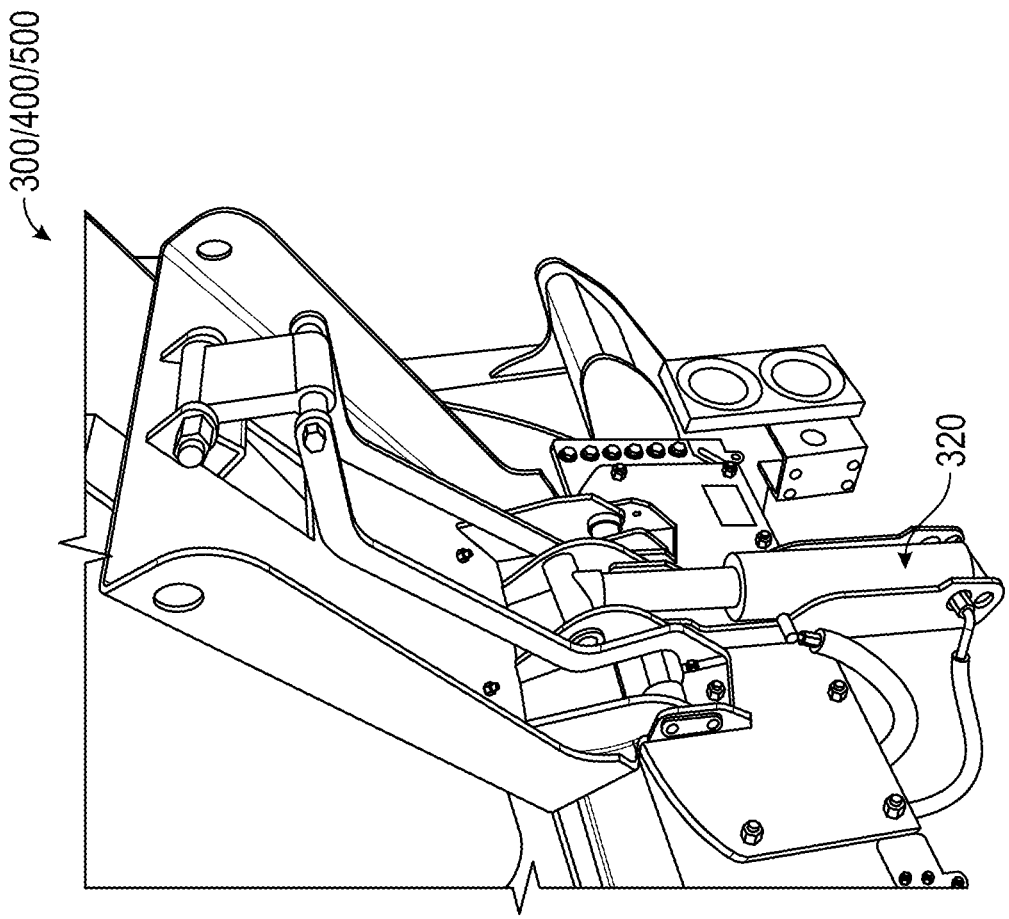

According to the various embodiments shown in FIGS. 19-22, various other types of actuators are usable with the lift assembly 300, the lift assembly 400, and/or the lift assembly 500 other than an electric motor directly or indirectly coupled to the tipper implement 506 of the lift assembly 500, the implement 410 of the lift assembly 400, and/or the engagement plate 310 of the lift assembly 300. As shown in FIG. 19, the pivot actuator 320 is configured as an electric motor acting through a push chain where the push chain is configured to engage with and pivot the tipper implement 506 of the lift assembly 500, the implement 410 of the lift assembly 400, and/or the engagement plate 310 of the lift assembly 300 between the base position and the dump position. As shown in FIG. 20, the pivot actuator 320 is configured as pneumatic rotary vane having an output shaft that is configured to pivot the tipper implement 506 of the lift assembly 500, the implement 410 of the lift assembly 400, and/or the engagement plate 310 of the lift assembly 300 between the base position and the dump position. In some embodiments, the pneumatic rotary vane is replaced with a hydraulic rotary actuator. The air and/or hydraulic fluid may be provided to the pneumatic rotary vane and/or the hydraulic rotary actuator by a fluid pump (e.g., a pneumatic pump, a hydraulic pump, etc.) driven by an electric motor. As shown in FIGS. 21 and 22, the pivot actuator 320 is a linear actuator configured to pivot the tipper implement 506 of the lift assembly 500, the implement 410 of the lift assembly 400, and/or the engagement plate 310 of the lift assembly 300 between the base position and the dump position. In some embodiments, the linear actuator is an electric linear actuator (e.g., a ball screw linear actuator driven by an electric motor, a ball screw linear actuator driven by an electric motor, a linear, mechanical actuator, etc.). In some embodiments, linear actuator is a fluidly operated actuator (e.g., a hydraulic cylinder, a pneumatic cylinder, etc.) operated by a fluid pump (e.g., a hydraulic pump, a pneumatic pump, etc.) driven by an electric motor (e.g., the electric motor 18, the secondary electric motor, an integrated motor of the fluid pump, etc.).

Figure 23:
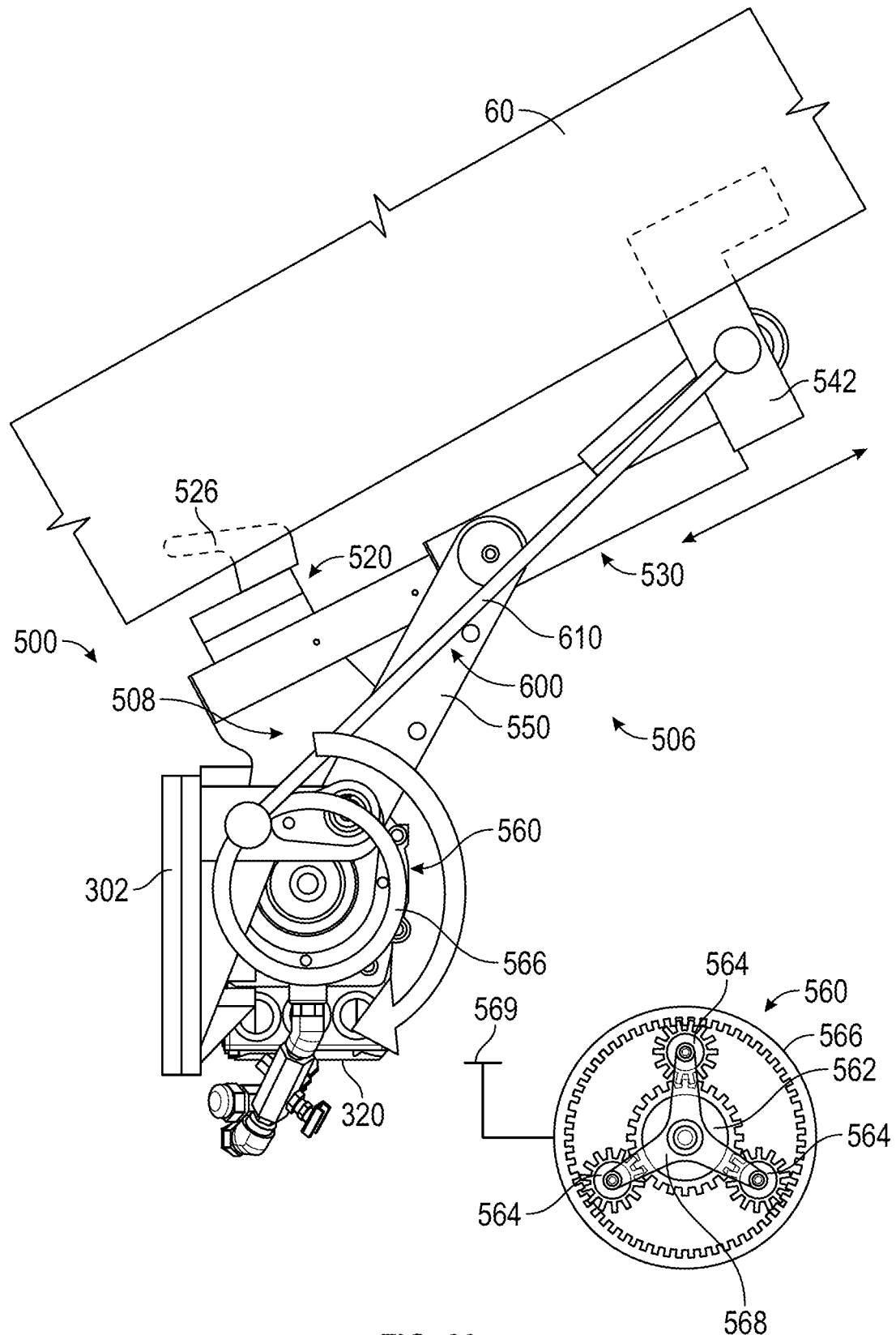
FIGS. 23-25 show various vibration/shake systems usable with the lift assembly of FIG. 2, according to various exemplary embodiments.
Figure 24:
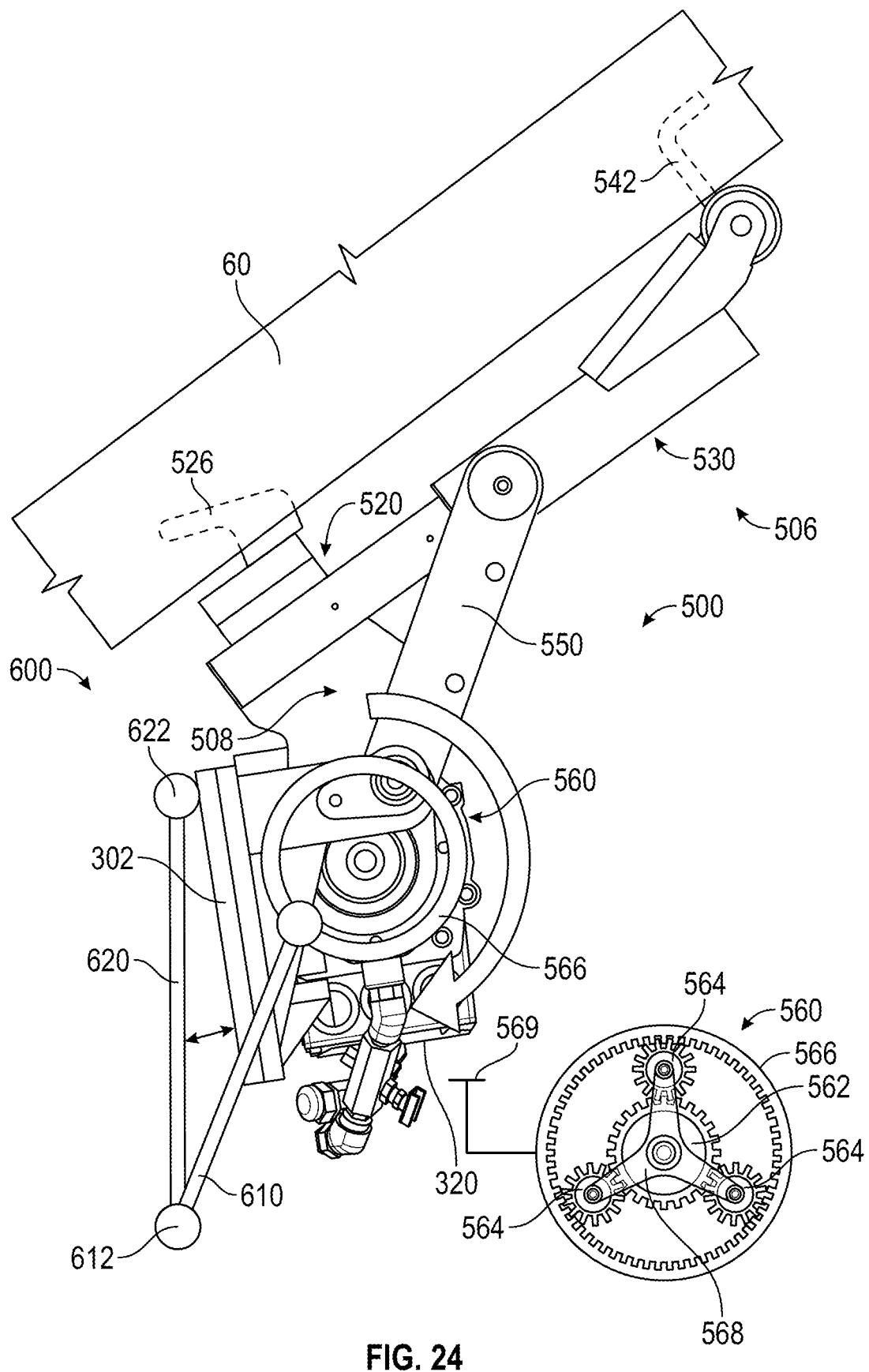
Figure 25:
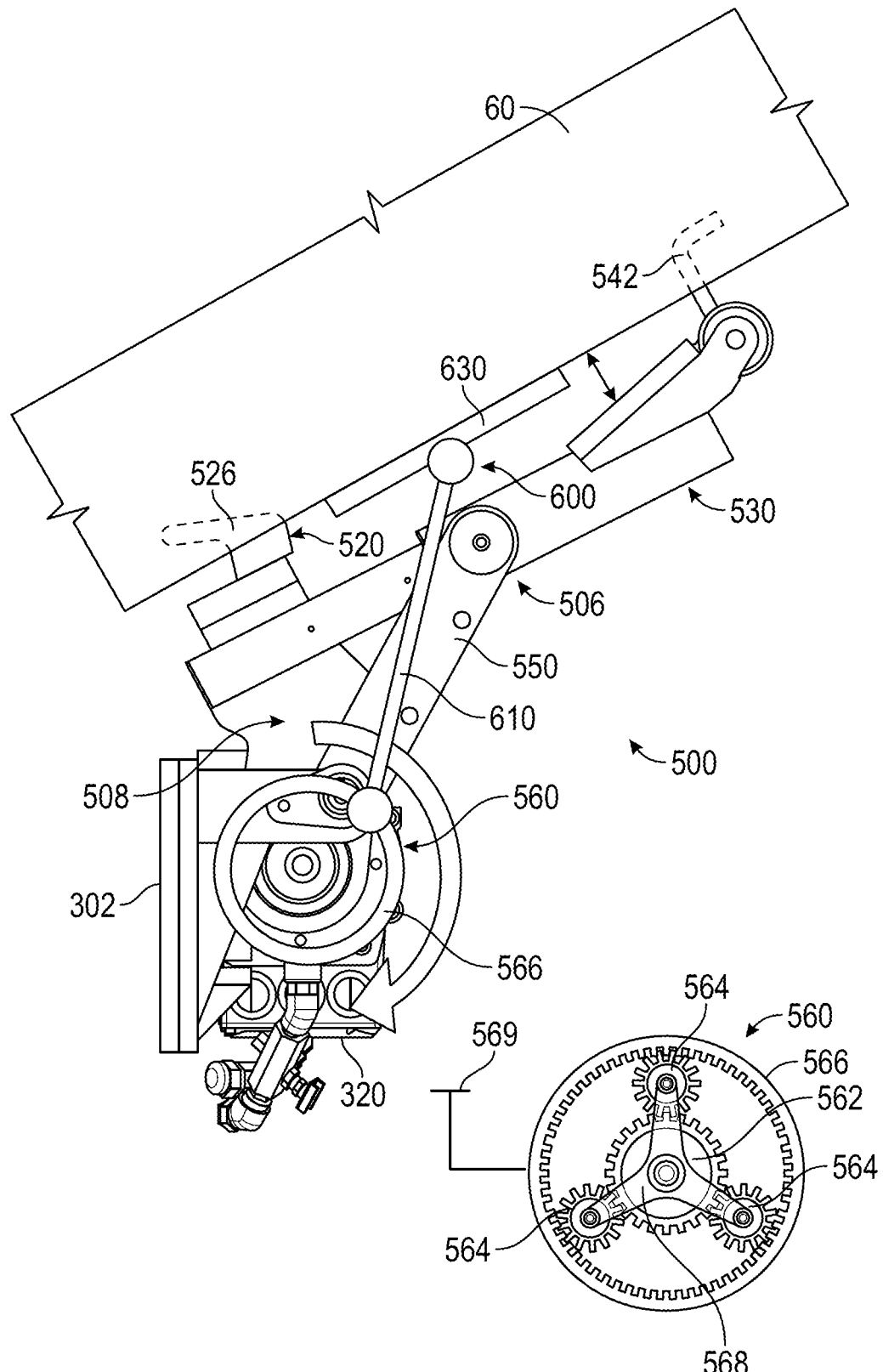

As shown in FIGS. 23-25, the lift assembly 500 includes a vibratory system, shown as shaker system 600. According to an exemplary embodiment, the shaker system 600 is configured to perform a shake function to vibrate, shake, or otherwise agitate the refuse container 60 when (i) the refuse container 60 is coupled to the tipper implement 506 and (ii) the tipper implement 506 is in the duping position to dislodge the contents within the refuse container 60 and coax them to fall out of the refuse container 60 into the hopper opening 35 in the tailgate 34 of the refuse vehicle 10. As shown in FIGS. 23-25, the shaker system 600 is used in combination with the pivot actuator 320 and the inline transmission device 560 to perform the shake function. Specifically, the inline transmission device 560 used with the shaker system 600 is a planetary or epicyclic gearbox having (i) a sun gear 562 coupled to the output of the pivot actuator 320, (ii) a plurality of planet gears 564 in meshing engagement with the sun gear 562, (iii) a ring gear 566 in meshing engagement with the plurality of planet gears 564, (iv) a carrier 568 coupled to (a) the plurality of planet gears 564 and (b) one of the pivot arms 508, and (v) a brake 569 positioned to selectively engage and prevent rotation of the ring gear 566. According to an exemplary embodiment, the inline transmission device 560 may be the cycloidal drive transmission device 700 described below in detail with reference to FIGS. 26-32.

As shown in FIG. 23, the shaker system 600 includes a first linkage or cam, shown as linkage 610, extending between the ring gear 566 and the lower retainer 542. In such an embodiment, the lower retainer 542 is configured to oscillate up and down within the retainer gap 540 to provide the shake function. Specifically, the shake function may be performed as follows: (i) the brake 569 is engaged to limit rotation of the ring gear 566; (ii) the pivot actuator 320 provides an input to the sun gear 562, which causes (a) the plurality of planet gears 564 to rotate about the sun gear 562 and relative to the ring gear 566 and (b) the carrier 568 to rotate with the plurality of planet gears 564; (iii) the rotation of the carrier 568 pivots the pivot arms 508 and, thereby, the tipper implement 506 about the pivot axis 502 from the base position to the dump position; (iv) when the dump position is reached, the tipper implement 506 experiences a hard stop that stops rotation of the carrier 568 and causes a torque spike; (v) the torque spike either (a) causes the braking force of the brake 569 on the ring gear 566 to be overcome such that the ring gear 566 begins to rotate or (b) causes the brake 569 to disengage such that the ring gear 566 begins to rotate; and (vi) the rotation of the ring gear 566 drives the linkage 610 therewith, which causes the lower retainer 542 to oscillate up and down, providing the shake function to the refuse container 60.

As shown in FIG. 24, the shaker system 600 includes the linkage 610 extending from the ring gear 566 and a second linkage, shown as linkage 620, having a first end pivotally coupled to an end of the linkage 610 opposite the ring gear 566 at a pivot 612 and an opposing second end pivotally coupled to a pivot 622 of the tailgate 34. The upper end of the base plate 302 may also be pivotally coupled to the pivot 622. In such an embodiment, the entire lift assembly 500 is configured to oscillate to provide the shake function. Specifically, the shake function may be performed as follows: (i) the brake 569 is engaged to limit rotation of the ring gear 566; (ii) the pivot actuator 320 provides an input to the sun gear 562, which causes (a) the plurality of planet gears 564 to rotate about the sun gear 562 and relative to the ring gear 566 and (b) the carrier 568 to rotate with the plurality of planet gears 564; (iii) the rotation of the carrier 568 pivots the pivot arms 508 and, thereby, the tipper implement 506 about the pivot axis 502 from the base position to the dump position; (iv) when the dump position is reached, the tipper implement 506 experiences a hard stop that stops rotation of the carrier 568 and causes a torque spike; (v) the torque spike either (a) causes the braking force of the brake 569 on the ring gear 566 to be overcome such that the ring gear 566 begins to rotate or (b) causes the brake 569 to disengage such that the ring gear 566 begins to rotate; and (vi) the rotation of the ring gear 566 drives the linkage 610 and the linkage 620 therewith, which causes the base plate 302 to pivotally oscillate about the pivot 622, providing the shake function to the refuse container 60.

As shown in FIG. 25, the shaker system 600 includes the linkage 610 extending from the ring gear 566 and plate, shown as shaker plate 630, (i) positioned between the upper retainer 526 and the lower retainer 542 to engage the refuse container 60 and (ii) coupled to an end of the linkage 610 opposite the ring gear 566. In such an embodiment, the shaker plate 630 is configured to oscillate to provide the shake function. Specifically, the shake function may be performed as follows: (i) the brake 569 is engaged to limit rotation of the ring gear 566; (ii) the pivot actuator 320 provides an input to the sun gear 562, which causes (a) the plurality of planet gears 564 to rotate about the sun gear 562 and relative to the ring gear 566 and (b) the carrier 568 to rotate with the plurality of planet gears 564; (iii) the rotation of the carrier 568 pivots the pivot arms 508 and, thereby, the tipper implement 506 about the pivot axis 502 from the base position to the dump position; (iv) when the dump position is reached, the tipper implement 506 experiences a hard stop that stops rotation of the carrier 568 and causes a torque spike; (v) the torque spike either (a) causes the braking force of the brake 569 on the ring gear 566 to be overcome such that the ring gear 566 begins to rotate or (b) causes the brake 569 to disengage such that the ring gear 566 begins to rotate;

and (vi) the rotation of the ring gear 566 drives the linkage 610 therewith, which causes the shaker plate 630 to oscillate, providing the shake function to the refuse container 60.

In other embodiments (e.g., embodiments where the lift assembly 500 does not include the inline transmission device 560, etc.), the shaker system 600 includes a shake actuator (e.g., an electric motor, etc.) independent of the pivot actuator 320 that performs the shake operation (e.g., by being coupled to and driving the linkage 610, the lower retainer 542, the linkage 620, the shaker plate 630, etc.). In still other embodiments (e.g., embodiments where the lift assembly 500 does not include the inline transmission device 560, embodiments where the shaker system 600 does not include the shaker actuator, etc.), the pivot actuator 320 is configured to perform the shake function by operating at the natural frequency thereof, which causes the lift assembly 500 to shake. Further, it should be understood that the shaker system 600 could similarly be implemented with the lift assembly 300 and/or the lift assembly 400.

Referring now to FIGS. 26-32, a cycloidal drive transmission device 700 is shown, according to an exemplary embodiment. In various embodiments, the inline transmission device 560 may be the cycloidal drive transmission device 700 as shown in FIGS. 26-32. In other embodiments, the offset transmission device 570 may be the cycloidal drive transmission device 700 as shown in FIGS. 26-32. In other embodiments, the cycloidal drive transmission device 700 may serve as a transmission device used elsewhere on the refuse vehicle 10. As noted above, an inline transmission device 560 or the offset transmission device 570—and thus the cycloidal drive transmission device 700—may be coupled to the pivot actuator 320 and one of the pivot arms 508 and may facilitate the movement of the pivot arms 508 to operate the tipper 500. In various inline arrangements, such as that shown in FIG. 12, the cycloidal drive transmission device 700 may be positioned along the pivot axis 502 (e.g., an in-line arrangement, etc.) between the pivot actuator 320 and at least one of the pivot arms 508 such that the pivot actuator 320 may drive the motion of the pivot arms 508 through the cycloidal drive transmission device 700. In various offset arrangements, such as that shown in FIG. 13, the cycloidal drive may not be positioned along the pivot axis 502, but may nonetheless be configured to rotate the at least one pivot arm 508 by rotating the shaft 572 using connector 574, as is discussed above.

The cycloidal drive transmission device 700 may be a speed-reducing device configured to produce a rotational output at a speed that is less than a rotational speed of an input. In particular, the cycloidal drive transmission device 700 may receive an input force from the pivot actuator 320, the input force having a rotational direction (e.g., clockwise, anticlockwise, etc.), and a rotational speed (e.g., 1000 RPM). The cycloidal drive transmission device 700 may transmit an output force having a rotational direction and a rotational speed, where the output rotational speed is less than the input rotational speed. In some embodiments, the cycloidal drive transmission device 700 may reduce the rotational speed of the input by a factor of 166.4 to one (i.e. a speed reduction ratio of 166.4:1) such that 166.4 rotations of an input from the pivot actuator 320 results in one rotation of an output device, as is described in further detail below. In some embodiments, the cycloidal drive transmission device 700 may produce an output having the same rotational direction as the input. In other embodiments, the output may have a rotational direction that is opposite the input.

As shown in FIGS. 26-32, the cycloidal drive transmission device 700 may include a primary shaft 701, one or more intermediate shafts 715, a first stage cycloidal drive 720, and a second stage cycloidal drive 728. The primary shaft 701 may have an input end 702, an output end 703, and a primary axis 704. The primary axis 704 may extend through a center point of both the input end 702 and the output end 703, whereas the primary axis 704 may not extend through a center point of various eccentric lobes of the primary shaft, as is discussed below. According to an exemplary embodiment, input end 702 is configured to couple to or engage with an input device (e.g., the pivot actuator 320) such that rotational energy produced by the pivot actuator 320 causes the primary shaft 701 to rotate. For example, the input end 702 may comprise splines, ridges, teeth, keys or keyways that correspond to grooves, keyways, or keys of a mating interface of the pivot actuator 320. As is discussed in greater detail below, the output end 703 of the primary shaft 701 may not be configured to engage with or coupled any output device but may instead rotate freely (i.e. without interacting with any other components besides friction-reducing elements). Accordingly, the output end may be a smooth shaft, rather than having splines, a keyway, etc. In various other embodiments, the cycloidal drive transmission device 700 may include one stage, or more than two stages.

The primary shaft 701 may further include a first eccentric lobe 705 and a second eccentric lobe 707. The first eccentric lobe may have a centerline, shown as first eccentric lobe axis 706. Likewise, the second eccentric lobe may have a centerline, shown as second eccentric lobe axis 708. According to an exemplary embodiment, the first eccentric lobe axis 706 and the second eccentric lobe axis 708 may not be coaxial, but may instead be offset with respect to each other. Moreover, both of the first eccentric lobe axis 706 and the second eccentric lobe axis 708 may be offset from the primary axis 704. Because the first eccentric lobe 705 and the second eccentric lobe 707 have centerlines that are offset from the primary axis 704, rotation of the primary shaft 701 about the primary axis 704, such as by input provided by the pivot actuator 320, will cause the eccentric rotation of the first eccentric lobe 705 and the second eccentric lobe 707 about the primary axis 704.

The one or more intermediate shafts 715 may include a first lobe 716 having a first lobe axis 717 and a second lobe 718 having a second lobe axis 719. Similar to the eccentric lobes 705, 707 of the primary shaft 701, the first lobe axis 717 may be offset from (i.e. not coaxial with) the second lobe axis 719. More specifically, the degree of offset between the first lobe axis 717 and the second lobe axis 719 may be equal to the degree of offset between the first eccentric lobe axis 706 and the second eccentric lobe axis 708 of the primary shaft 701. Unlike the primary shaft 701, the one or more intermediate shafts 715 may not include an input end configured to couple to or interact with an input device. Rather, the one or more intermediate shafts 715 may rotate as components of the first stage cycloidal drive 720 and second stage cycloidal drive 728 rotate.

The first stage cycloidal drive 720 may include a housing 721, a first cycloidal disc 722, a plurality of ring pins 726, and a plurality of ring pin sleeves 727. Each of the first cycloidal disc 722, the plurality of ring pins 726 and the plurality of ring pin sleeves 727 may be housed within the housing 721, according to an exemplary embodiment. More specifically, the housing 721 may include an interior cavity that is configured to receive the first cycloidal disc 722, the plurality of ring pins 726, and the plurality of ring pin sleeves 727 and may permit the first cycloidal disc 722 to rotate about the primary axis 704, as is described in detail below.

The first cycloidal disc 722 may include a plurality of lobes 723, a primary aperture 724, one or more intermediate apertures 725, and one or more additional apertures 739. The primary aperture 724 may be configured to receive and couple to the primary shaft 701, namely the first eccentric lobe 705 of the primary shaft 701. Accordingly, the primary aperture 724 may have a diameter that is proximate to a diameter of the first eccentric lobe 705, although the diameter of the primary aperture 724 may be larger than the diameter of the first eccentric lobe 705 as to accommodate friction-reducing elements (e.g., roller bearings, thrust bearings, etc.). The first eccentric lobe axis 706 may be coaxial with an axis of the primary aperture 724. In various embodiments, the first eccentric lobe 705 of the primary shaft 701 is operationally coupled to the first cycloidal disc 722 via the primary aperture 724 such that the first cycloidal disc 722 rotates as the primary shaft 701 rotates.

The one or more intermediate apertures 725 may be configured to receive one of the one or more intermediate shafts 715. Specifically, each of the one or more intermediate apertures 725 may receive the first lobe 716 of an intermediate shaft 715 such that the first lobe axis 717 is coaxial with an axis of the intermediate aperture 725. In various embodiments, the intermediate shaft 715 may be rotatably coupled to the first cycloidal disc 722 via the intermediate aperture 725. The additional apertures 739 may be configured to receive additional intermediate shafts 715 as described above or may instead serve to reduce the weight of the first cycloidal disc 722. According to an exemplary embodiment, the primary aperture 724 is located at or proximate to a center point (i.e. center of gravity) of the first cycloidal disc 722. The one or more intermediate apertures 725 and one or more additional apertures 739 may be located radially around the center point of the first cycloidal disc 722 such that the apertures 725, 739 are not located at the center of gravity of the first cycloidal disc 722.

Figure 31:
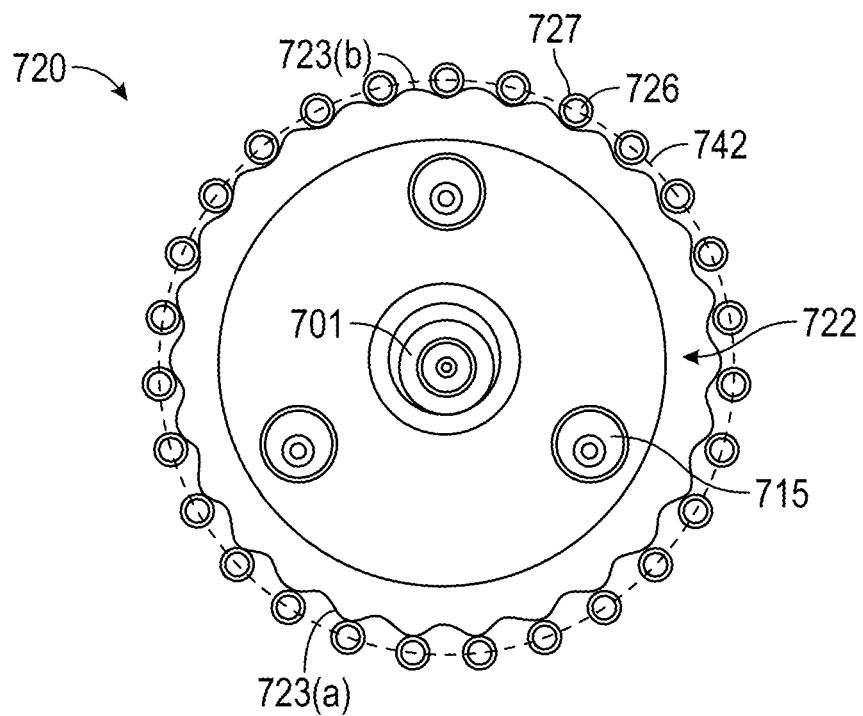
FIG. 31 is a front view of the cycloidal drive transmission device FIG. 28, according to an exemplary embodiment.

The plurality of lobes 723 may be disposed around a lateral surface (i.e. an exterior, perimeter surface) of the first cycloidal disc 722, as is shown in greater detail in FIG. 31. Each of the lobes 723 may have a generally curved, roulette shape. With the lobes 723 disposed around the lateral surface of the first cycloidal disc 722, the first cycloidal disc 722 may exhibit a generally cycloidal shape, according to an exemplary embodiment. As is well understood in the geometric arts, a cycloidal shape corresponds to a fixed point of a "rolling circle" that is traced as the rolling circle rolls along a "base circle," according to an exemplary embodiment. Furthermore, the first cycloidal disc 722 (and thus the lobes 723) may be formed as an ordinary cycloidal disc (i.e. a simple cycloid) or a contracted cycloidal disc (i.e. a prolate cycloid).

As noted above, the first stage cycloidal drive 720 also includes a plurality of ring pins 726 and ring pin sleeves 727. Each of the plurality of ring pins 726 and ring pin sleeves 727 may be fixedly or rotatably coupled to the housing 721. The ring pins 726 may have a generally cylindrical shape and may be received by a cylindrical aperture formed through the ring pin sleeves 727 (i.e. the ring pins 726 ride within the ring pin sleeves 727). The plurality of ring pins 726 and ring pin sleeves 727 may be arranged in a spaced-apart, circular, and symmetric fashion around the first cycloidal disc 722, but within the housing 721. In various embodiments, the lobes 723 of the first cycloidal disc 722 are configured to interact with the ring pins 726 and ring pin sleeves 727 as the first cycloidal disc 722 is rotated by the primary shaft 701. However, as noted above, the first cycloidal disc 722 is specifically coupled to the first eccentric lobe 705 of the primary shaft 701; when the primary shaft 701 rotates about the primary axis 704, the first cycloidal disc 722 rotates about the primary axis 704 in an eccentric fashion. Therefore, the first cycloidal disc 722 rotates about the primary axis 704 in an eccentric fashion, thereby causing the lobes 723 to move along a circular path of rotation forming a circle that is greater in diameter than a diameter of the first cycloidal disc 722 itself. Because the first cycloidal disc 722 is configured to interact with the ring pins 726 and ring pin sleeves 727, the ring pins 726 and the ring pin sleeves 727 must be arranged in a circle that corresponds to the eccentric path of rotation of the first cycloidal disc 722. Accordingly, the ring pins 726 and ring pin sleeves 727 may be arranged symmetrically about a reference pitch circle 742 having a diameter that is greater than a diameter of the first cycloidal disc 722. Furthermore, the number of lobes 723 must be less than the number of ring pins 726 so that the arrangement of ring pins 726 may form a circle that is greater in diameter than the first cycloidal disc 722 while still interacting with the lobes 723 of the first cycloidal disc 722, according to an exemplary embodiment.

As the first cycloidal disc 722 rotates about the primary axis 704, a portion of the first cycloidal disc 722—namely one or more (but not all) of the plurality of lobes 723—contacts (i.e. interacts with, meshes with, rides between, etc.) one or more of the plurality of ring pins 726 and sleeves 727. As shown in FIG. 31, a portion of the lobes 723, such as lobe 723(*b*), interact or mesh with the ring pins 726 and sleeves 727, while a second portion of the lobes 723, such as lobe 723(*a*), do not interact or mesh with the ring pins 726 and sleeves 727. Moreover, as the first cycloidal disc 722 rotates about the primary axis 704, the lobe 723(*a*) may interact or mesh with the ring pins 726 and sleeves 727, while the lobe 723(*b*) does not, according to an exemplary embodiment. In other words, the first cycloidal disc 722 rotates eccentrically along the reference pitch circle 742 formed by the plurality of ring pins 726. As the first cycloidal disc 722 rotates, the lobes 723 may ride around the ring pins 726 and ring pin sleeves 727 and may be periodically inserted into a space formed between adjacent ring pins 726 and ring pin sleeves 727, as shown in FIG. 31. The interaction between the lobes 723 and the ring pins 726 and sleeves 727 is akin to meshing of gears, for example. Accordingly, the rotation of the first cycloidal disc 722 imparts a contact force and frictional force on the plurality of ring pins 726 and the ring pin sleeves 727 via the lobes 723.

Because the first cycloidal disc 722 rotates eccentrically (i.e. does not rotate about its own center of gravity), the rotational motion of the first cycloidal disc 722 around its center of gravity is opposite to the direction of rotation about the primary axis 704 (the axis about which the first cycloidal disc 722 does rotate). Therefore, the intermediate apertures 725, will rotate in a direction opposite the rotational direction of the primary shaft 701 about the primary axis 704. Therefore, the first stage cycloidal drive 720 creates a counter-rotating force that is exerted by the intermediate apertures 725, according to an exemplary embodiment. For example, the clockwise rotation of the primary shaft 701 produces a counter-clockwise rotation of the intermediate apertures 725.

Figure 26:
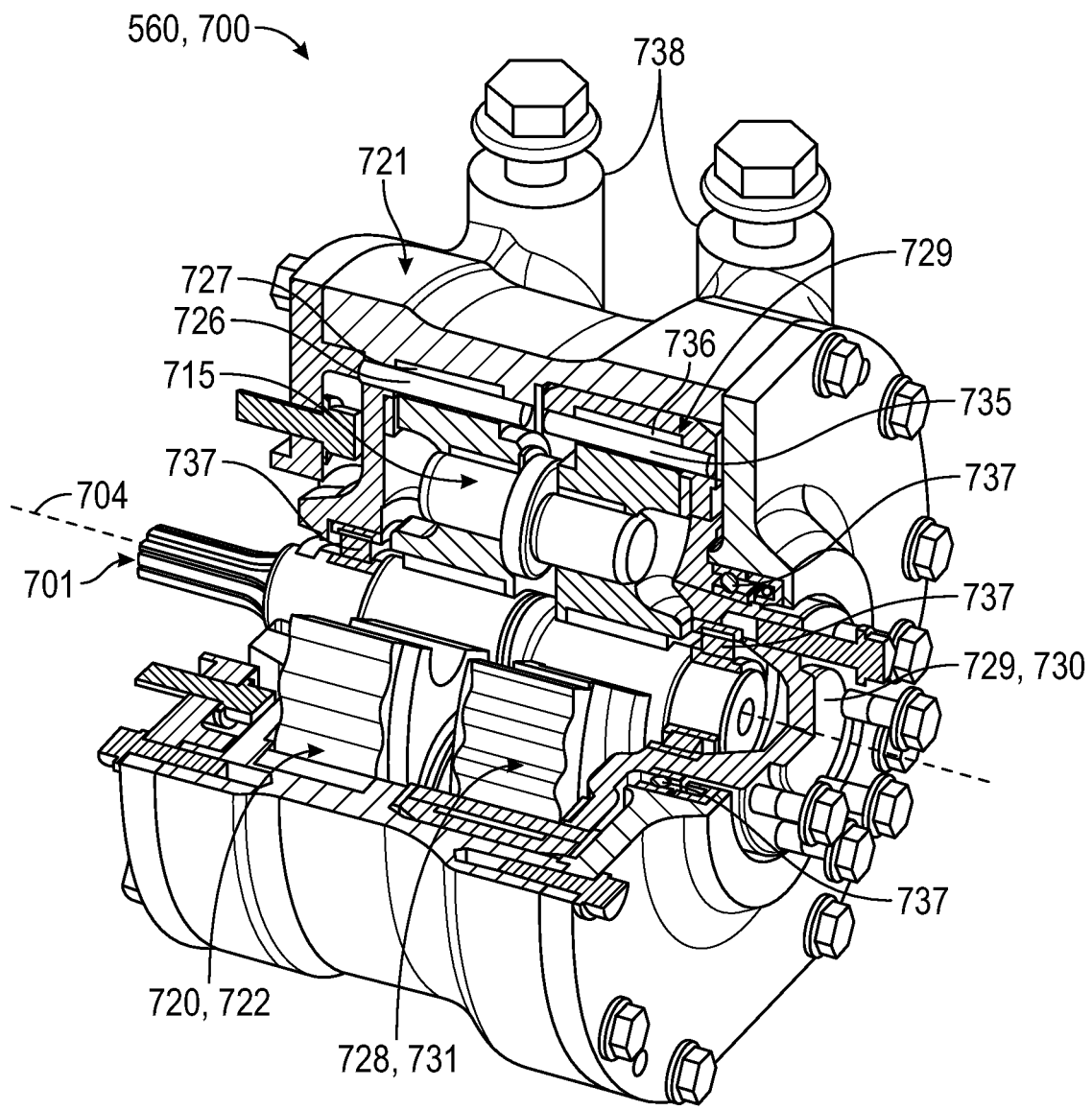
FIG. 26 is a cut-away perspective view of a cycloidal drive transmission device, according to an exemplary embodiment.
Figure 27:
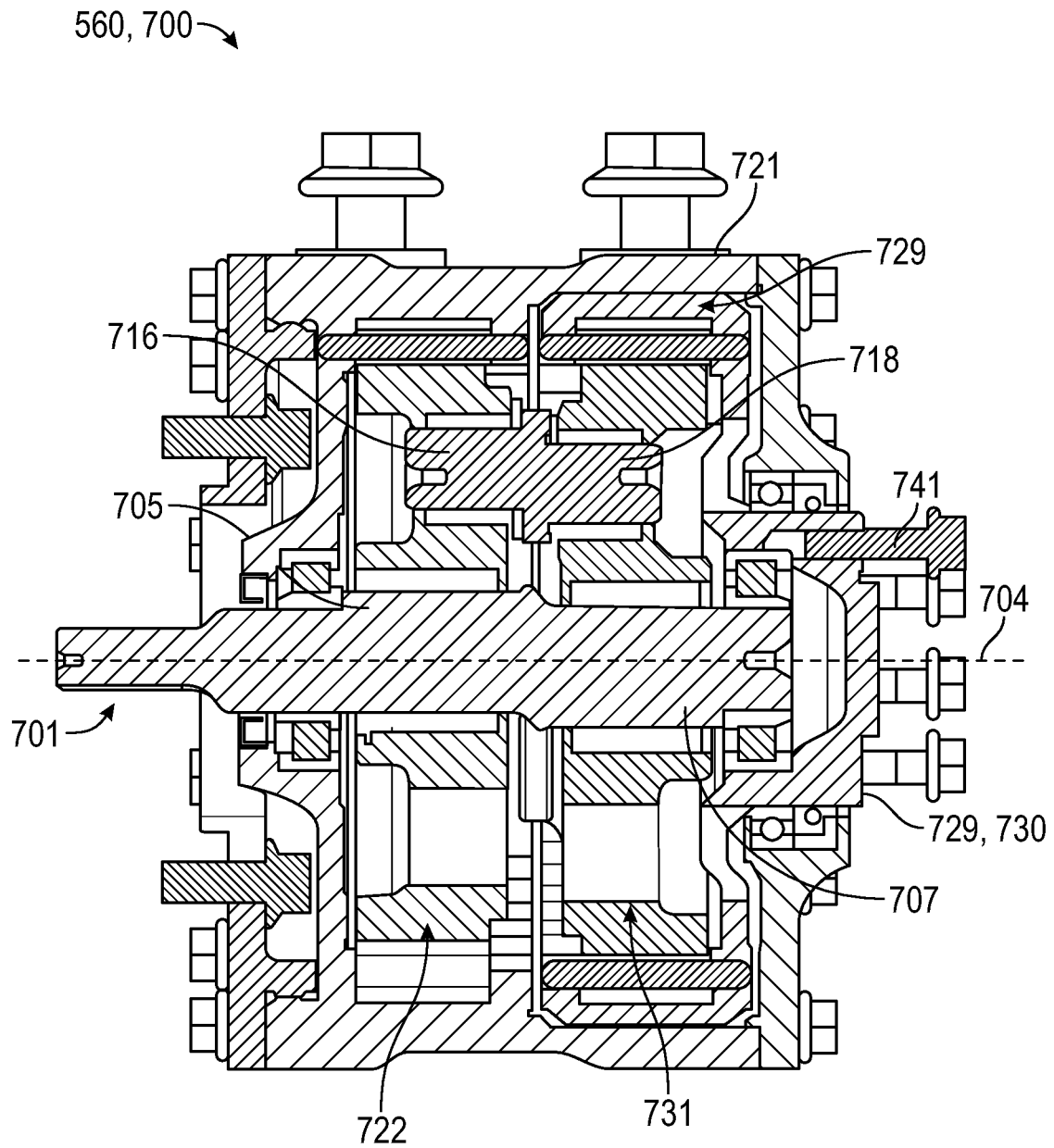
FIG. 27 is a cross-sectional view of the cycloidal drive transmission device of FIG. 26, according to an exemplary embodiment.
Figure 28:
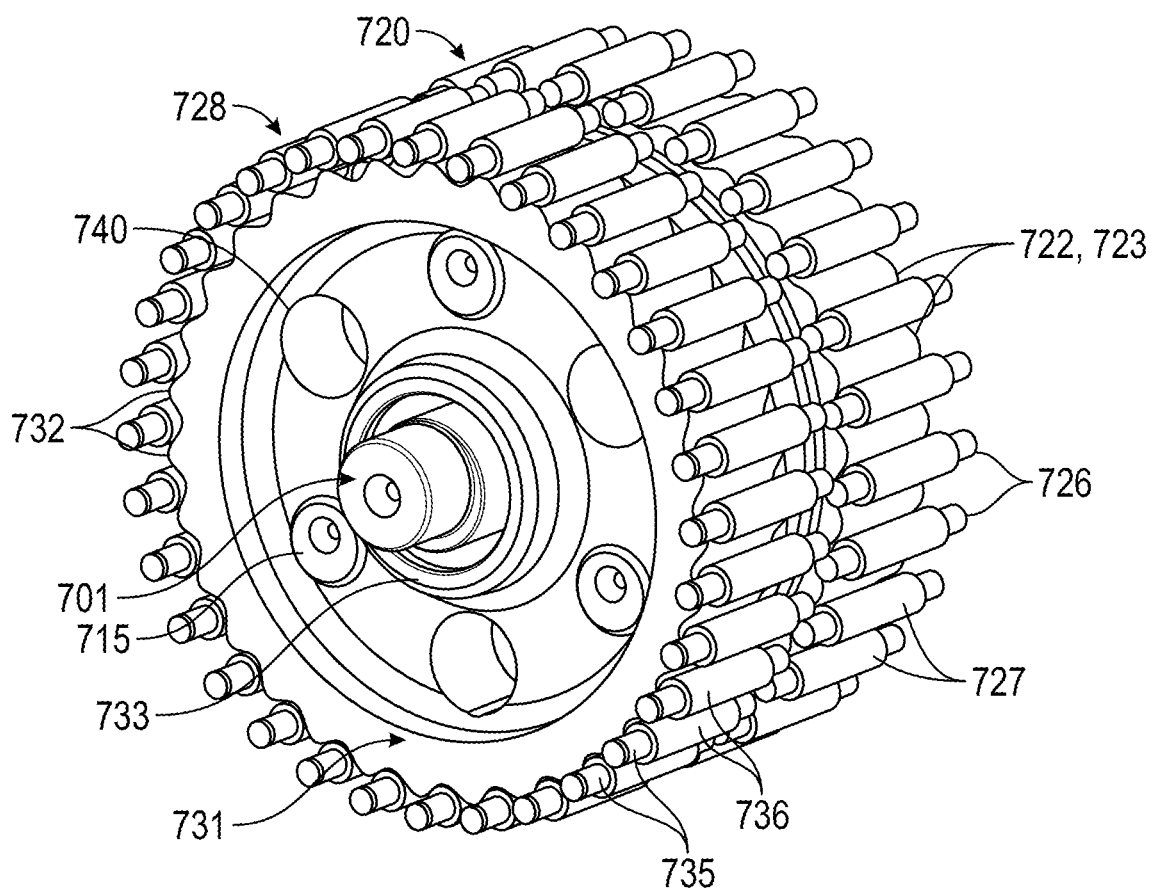
FIG. 28 is a rear perspective view of the cycloidal drive transmission device of FIG. 26, according to an exemplary embodiment.
Figure 29:
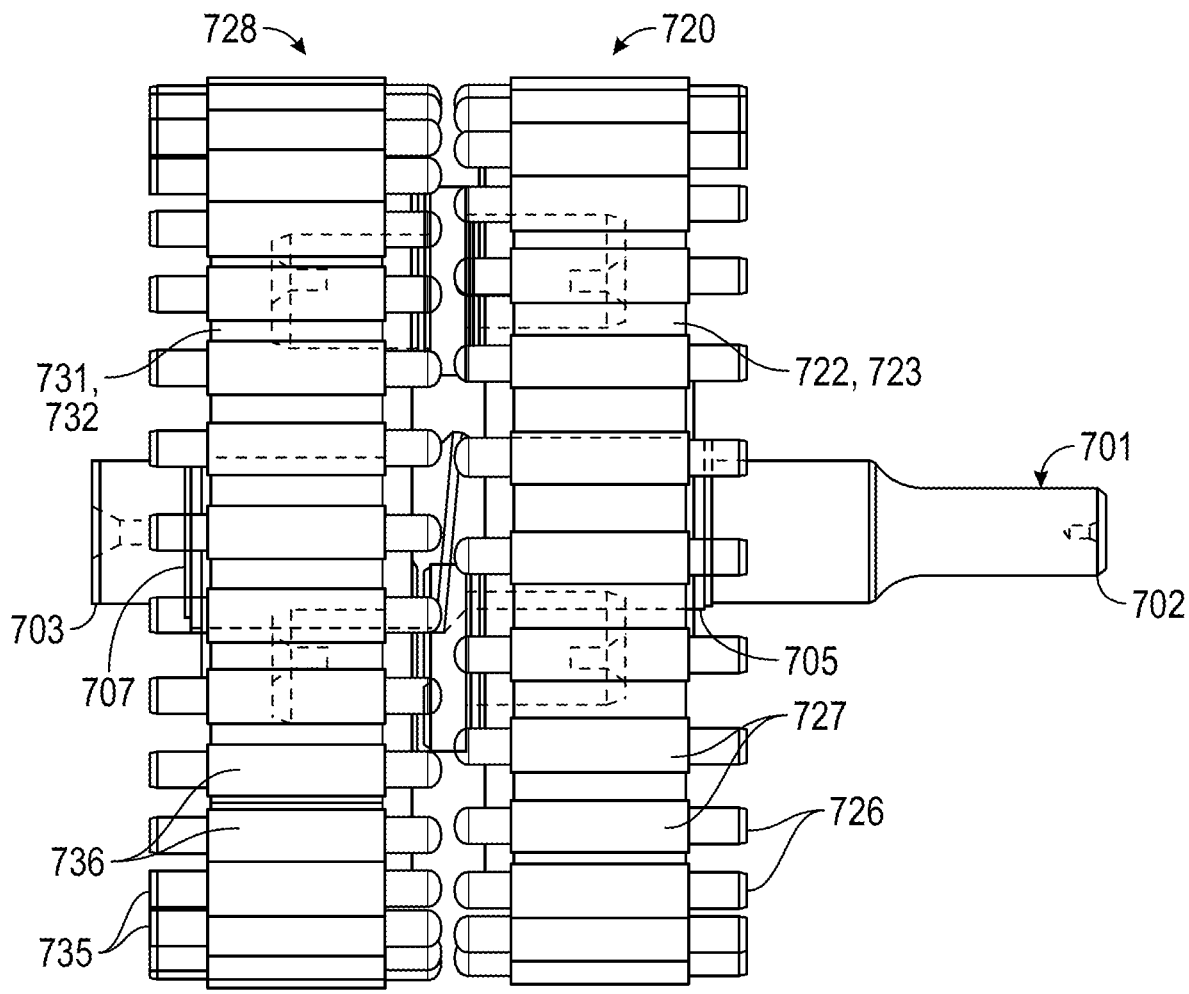
FIG. 29 is a side view of the cycloidal drive transmission device of FIG. 26, according to an exemplary embodiment.
Figure 30:
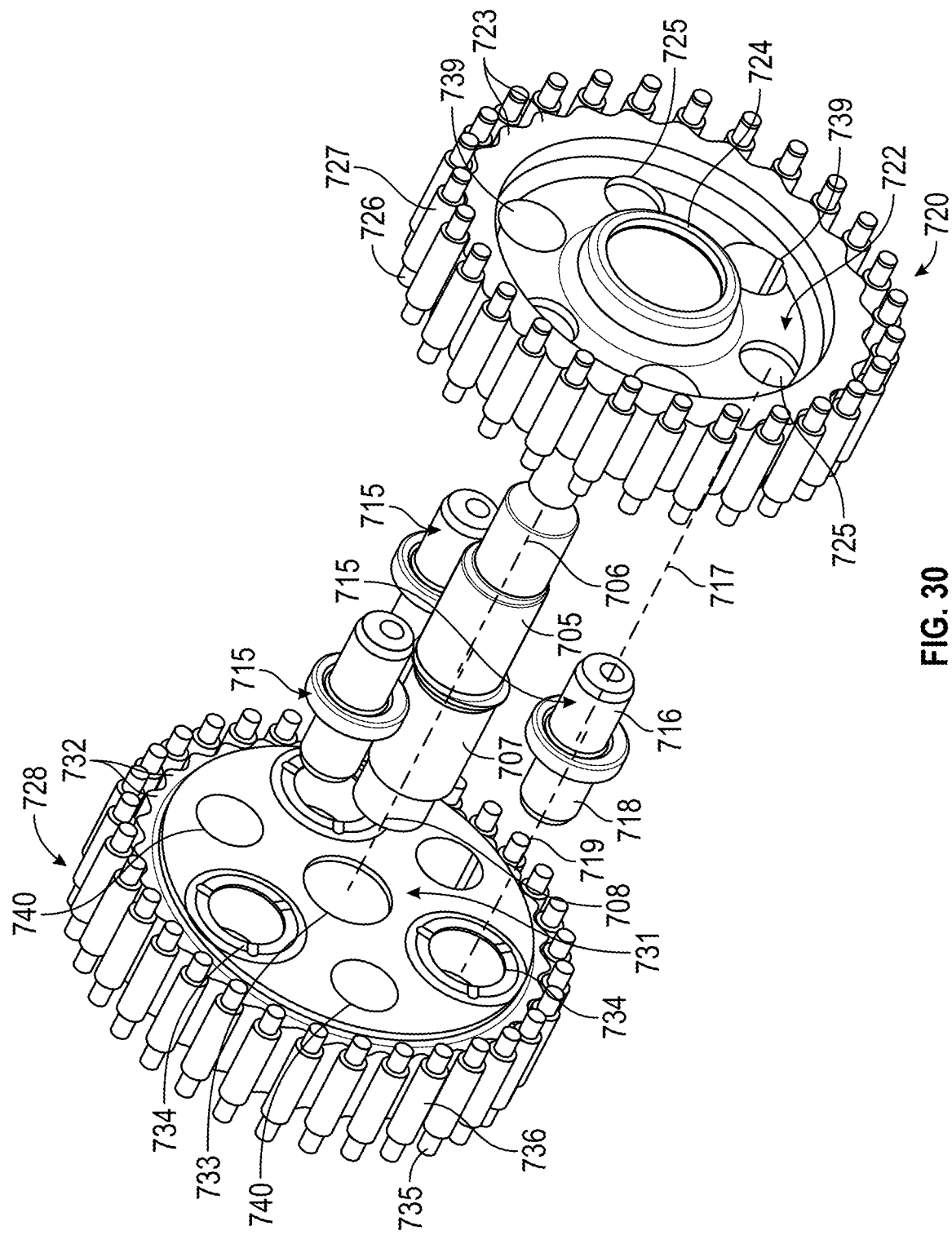
FIG. 30 is an assembly view of the cycloidal drive transmission device FIG. 26, according to an exemplary embodiment.

The second stage cycloidal drive 728 may include an annulus 729, a second cycloidal disc 731, a plurality of ring pins 735, and a plurality of ring pin sleeves 736. Each of the second cycloidal disc 731, the plurality of ring pins 735 and the plurality of ring pin sleeves 736 may be positioned within the annulus 729, according to an exemplary embodiment. The annulus 729 may include an interior cavity that is configured to receive the second cycloidal disc 731, the plurality of ring pins 735, and the plurality of ring pin sleeves 736 and may permit the second cycloidal disc 731 to rotate about the primary axis 704, as is described in detail below. As is depicted in FIGS. 26 and 27, the annulus 729 may itself be housed within the housing 721 described above with reference to the first stage cycloidal drive 720. The annulus 729 may be configured to rotate within the housing 721 about the primary axis 704, as is discussed in further detail below. Furthermore, the annulus 729 may include a coupling interface 730 configured to directly or indirectly couple to one or more pivot arms 508, as is described in greater detail below. The coupling interface 730 may couple to the pivot arms 508 via shank-style fasteners that correspond to a plurality of apertures 741 formed within the coupling interface 730, as is shown in FIGS. 26 and 27, although alternative coupling methods or arrangements may also be used.

The second cycloidal disc 731, like the first cycloidal disc 722, may include a plurality of lobes 732, a primary aperture 733, one or more intermediate apertures 734, and one or more additional apertures 740. The primary aperture 733 may be configured to receive and couple to the primary shaft 701, namely the second eccentric lobe 707 of the primary shaft 701. Accordingly, the primary aperture 733 may have a diameter that is proximate to a diameter of the second eccentric lobe 707, although the diameter of the primary aperture 733 may be larger than the diameter of the second eccentric lobe 707 as to accommodate friction-reducing elements (e.g., roller bearings, thrust bearings, etc.). The first eccentric lobe axis 706 may be coaxial with an axis of the primary aperture 724. In various embodiments, the second eccentric lobe 707 of the primary shaft 701 is operationally coupled to the second cycloidal disc 731 via the primary aperture 733 such that the second cycloidal disc 731 rotates as the primary shaft 701 rotates. In various other embodiments, the primary shaft 701 may rotate freely within the primary aperture 733 such that the rotation of the primary shaft 701 does not directly cause the rotation of the second cycloidal disc 731 via the primary aperture 733, although rotation of the primary shaft 701 may still indirectly cause the rotation of the second cycloidal disc 731 via the intermediate shafts 715 and/or the first cycloidal disc 722, as is discussed in further detail below.

The one or more intermediate apertures 734 may be configured to receive one of the one or more intermediate shafts 715. Specifically, each of the one or more intermediate apertures 734 may receive the second lobe 718 of an intermediate shaft 715 such that the second lobe axis 719 is coaxial with an axis of the intermediate aperture 734. In various embodiments, the intermediate shaft 715 may be rotatably coupled to the second cycloidal disc 731 via the intermediate aperture 734. The additional apertures 740 may be configured to receive additional intermediate shafts 715 as described above or may instead serve to reduce the weight of the second cycloidal disc 731. According to an exemplary embodiment, the primary aperture 733 is located at or proximate to a center point (i.e. center of gravity) of the second cycloidal disc 731. The one or more intermediate apertures 734 and one or more additional apertures 740 may be located radially around a center point of the second cycloidal disc 731 such that the apertures 734, 740 are not located at the center of gravity of the second cycloidal disc 731.

Figure 32:
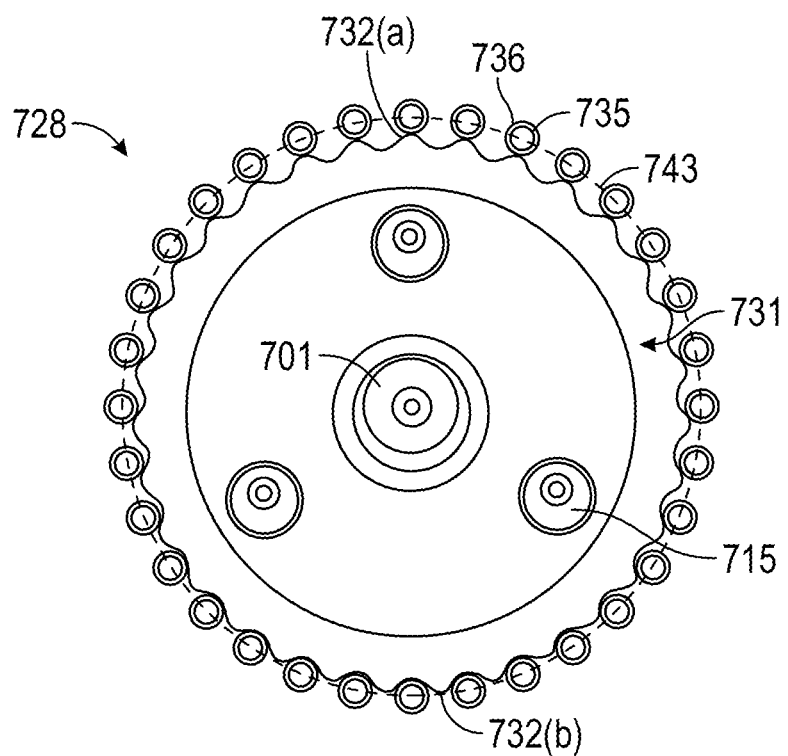
FIG. 32 is a rear view of the cycloidal drive transmission device FIG. 28, according to an exemplary embodiment.

The plurality of lobes 732 may be disposed around a lateral surface (i.e. an exterior, perimeter surface) of the second cycloidal disc 731, as is shown in greater detail in FIG. 32. Each of the lobes 732 may have a generally curved, roulette shape. With the lobes 732 disposed around the lateral surface of the second cycloidal disc 731, the second cycloidal disc 731 may exhibit a generally cycloidal shape, according to an exemplary embodiment. As is well understood in the geometric arts, a cycloidal shape corresponds to a fixed point of a "rolling circle" that is traced as the rolling circle rolls along a "base circle," according to an exemplary embodiment. Furthermore, the second cycloidal disc 731 (and thus the lobes 732) may be formed as an ordinary cycloidal disc (i.e. a simple cycloid) or a contracted cycloidal disc (i.e. a prolate cycloid).

As noted above, the second stage cycloidal drive 728 also includes a plurality of ring pins 735 and ring pin sleeves 736. Each of the plurality of ring pins 735 and ring pin sleeves 736 may be fixedly or rotatably coupled to the annulus 729. The ring pins 735 may have a generally cylindrical shape and may be received by a cylindrical aperture formed through the ring pin sleeves 736 (i.e. the ring pins 735 ride within the ring pin sleeves 736). The plurality of ring pins 735 and ring pin sleeves 736 may be arranged in a spaced-apart, circular, and symmetrical fashion around the second cycloidal disc 731, but within the annulus 729 and thus also within the housing 721. In various embodiments, the lobes 732 of the second cycloidal disc 731 are configured to interact with the ring pins 735 and ring pin sleeves 736 as the second cycloidal disc 731 is rotated. However, as noted above, the second cycloidal disc 731 is specifically coupled to the second eccentric lobe 707 of the primary shaft 701; when the primary shaft 701 rotates about the primary axis 704, the second cycloidal disc 731 may rotate about the primary axis 704 in an eccentric fashion, as defined by the second eccentric lobe 707. Therefore, the second cycloidal disc 731 rotates about the primary axis 704 in an eccentric fashion, which causes the lobes 732 to move along a circular path of rotation forming a circle that is greater in diameter than a diameter of the second cycloidal disc 731 itself. Because the second cycloidal disc 731 is configured to interact with the ring pins 735 and ring pin sleeves 736, the ring pins 735 and ring pin sleeves 736 must be arranged in a circle that corresponds to the eccentric path of rotation of the second cycloidal disc 731. Accordingly, the ring pins 735 and ring pin sleeves 736 may be arranged symmetrically about a reference pitch circle 743 having a diameter that is greater than a diameter of the second cycloidal disc 731. Furthermore, the number of lobes 732 must be less than the number of ring pins 735 so that the arrangement of ring pins 735 may form a circle that is greater in diameter than the second cycloidal disc 731 while still interacting with the lobes 732 of the second cycloidal disc 731, according to an exemplary embodiment.

As the second cycloidal disc 731 rotates about the primary axis 704, a portion of the second cycloidal disc 731— namely one or more (but not all) of the plurality of lobes 732— contacts (i.e. interacts with, meshes, rides between) one or more of the plurality of ring pins 735 and ring pin sleeves 736. As is shown in FIG. 32, a portion of the lobes 732, such as lobe 732(b) interact or mesh with the ring pins 735 and sleeves 736 at a point in time, while a second portion of lobes 732, such as lobe 732(a) do not interact with the ring pins 735 and sleeves 736. Moreover, as the second cycloidal disc 731 rotates about the primary axis 704, the lobe 732(*a*) may interact or mesh with the ring pins 735 and sleeves 736 while lobe 732(*b*) does not interact with the ring pins 735 and sleeves 736, according to an exemplary embodiment. In other words, the second cycloidal disc 731 rotates eccentrically along the reference pitch circle 743 formed by the plurality of ring pins 735. As the second cycloidal disc 731 rotates, the lobes 732 may ride around the ring pins 726 and ring pin sleeves 727 and may be periodically inserted into a space formed by adjacent ring pins 726 and ring pin sleeves 727, as shown in FIG. 32.

The interaction between the lobes 732 and the ring pins 735 and sleeves 736 is akin to meshing of gears, for example. Accordingly, the rotation of the second cycloidal disc 731 causes a contact force and a frictional force to be imparted on the plurality of ring pins 735 and the ring pin sleeves 736 via the lobes 732. The contact force and frictional force may further cause the annulus 729 to rotate within the housing 721. More specifically, the forces imparted on the ring pins 735 and sleeves 736 may be transferred to the annulus 729, which is rotatably or fixedly coupled to the ring pins 735 and sleeves 736, according to an exemplary embodiment.

As noted above, the annulus 729 may include a coupling interface 730 that is configured to facilitate coupling of the annulus 729 to the pivot arms 508, according to an exemplary embodiment. In some embodiments, the coupling interface 730 may directly couple to a pivot arm 508 (i.e. no intervening components positioned between the pivot arm 508 and the coupling interface 730). In other embodiments, the coupling interface 730 may indirectly couple to a pivot arm 508 (i.e. via some other intervening components). When coupled to the annulus 729 via the coupling interface 730, the pivot arm(s) 508 may rotate with the annulus 729. The rotation of the pivot arm(s) 508 in turn causes the tipper implement 506 and the refuse container 60 to rotate about pivot axis 502, to facilitate dumping the contents within the refuse container 60 (e.g., trash, recyclables, etc.) into the refuse compartment 30 through the hopper opening 35 in the tailgate 34 of the refuse vehicle 10. In other words, the rotation of the shaft 701 about the primary axis 704 causes the pivot arm(s) 508 to rotate to dump refuse into the refuse compartment 30.

While the first cycloidal disc 722 and the second cycloidal disc 731 are shown in FIGS. 26-32 and described above as interacting with each other via the intermediate shafts 715, it should be understood that other configurations are possible. For example, in some embodiments, the first cycloidal disc 722 may be directly coupled to the second cycloidal disc 731 such that rotation of the first cycloidal disc 722 causes the same rotation of the second cycloidal disc 731. Put another way, the first cycloidal disc 722 and the second cycloidal disc 731 may not interact via one or more intermediate shafts 715 (i.e. rotatable shafts) but may instead be fixedly coupled together so that the discs 722, 731 do not rotate with respect to each other. Such a configuration does not require the use of intermediate shafts 715 as herein described.

As depicted in FIGS. 31 and 32, the first cycloidal disc 722 and the second cycloidal disc 731 may exhibit a 180 degree displacement relative to the primary axis. As noted above, the first cycloidal disc 722 may rotate about the first eccentric lobe axis 706, while the second cycloidal disc 731 may rotate about the second eccentric lobe axis 708. Both the first eccentric lobe axis 706 and the second eccentric lobe axis 708 may be spaced apart from, but parallel to, the primary axis 704. According to an exemplary embodiment, the first eccentric lobe axis 706 may be spaced apart from the primary axis 704 in a first direction, while the second eccentric lobe axis 708 is spaced apart from the primary axis 704 in a second direction. The second direction may be diametrically opposed to the first direction such that the first eccentric lobe axis 706 is positioned 180 degrees from the second eccentric lobe axis 708, as is depicted in FIGS. 31 and 32. Furthermore, the first eccentric lobe axis 706 may be spaced apart from the primary axis 704 at a first distance that corresponds to a diameter of the first cycloidal disc 722 and a diameter of reference pitch circle 742, while the second eccentric lobe axis 708 may be spaced apart from the primary axis 704 at a second distance that corresponds to a diameter of the second cycloidal disc 731 and reference pitch diameter 743. Accordingly, it is possible for the diameter of the first cycloidal disc 722 and the diameter of the second cycloidal disc 731 to vary such that the diameter of the first cycloidal disc 722 may be greater than, equal to, or less than the diameter of the second cycloidal disc 731.

The cycloidal drive transmission device 700 may further include a plurality of friction-reducing elements 737 to facilitate the rotation of various components with respect to each other. More specifically, the friction-reducing elements 737 may be included to minimize or eliminate friction forces that may exist as two components rotate relative to and in close proximity to each other. The friction-reducing elements 737 may be roller bearings, ball bearings, or similar devices. For example, as shown in FIG. 26, the output end 703 of the primary shaft 701 may interact with a friction-reducing element 737 so that the output end 703 may rotate in a substantially free fashion. Likewise, friction-reducing elements 737 may be used to facilitate the rotation of the annulus 729 relative to the housing 721, according to an exemplary embodiment. In various other embodiments, more or fewer friction-reducing elements 737 may be used.

At a high level, the cycloidal drive transmission device 700 operates as a speed reduction device configured to reduce the rotational speed of an input rotational force. More specifically, the cycloidal drive transmission device 700 is configured to receive an input rotational force having an input rotational force direction from the input end 702 of the primary shaft 701. Rotation of the primary shaft 701 causes the first cycloidal disc 722 to rotate eccentrically about the primary axis 704 via the first eccentric lobe 705. The eccentric rotation of the first cycloidal disc 722 causes the counter-rotation of the intermediate shafts 715. The rotation of the intermediate shafts 715 and the rotation of the second eccentric lobe 707 of the primary shaft 701 causes the rotation of the second cycloidal disc 731. According to an exemplary embodiment, the eccentric rotation of the second cycloidal disc 731 about the primary axis 704 causes the second cycloidal disc 731 to counter-rotate relative to the input rotational force direction. The rotation of the second cycloidal disc 731 causes the lobes 732 of the second cycloidal disc 731 to interact with and impart contact and/or frictional forces on the ring pins 735 and sleeves 736. The force applied to the ring pins 735 and sleeves 736 is in turn transferred to the annulus 729, which then rotates in the same direction as the input rotational force direction by virtue of the eccentric rotation of the second cycloidal disc 731. The rotation of the annulus 729 then causes the rotation of the pivot arm(s) 508, according to an exemplary embodiment. Furthermore, the eccentric rotation of the cycloidal discs 722, 731 will result in a reduced output rotational speed relative to the input rotational force. As a result, the output rotational force applied to the pivot arms 508 will exhibit a reduced speed relative to the input rotational force supplied by the pivot actuator 320. In various other embodiments, the cycloidal drive transmission device 700 may provide an output force via a pin disc rather than an annulus. More specifically, the pin disc may have a central shaft protruding in a first direction from a plate-like structure and a plurality of intermediate pins protruding in a second direction from the plate-like structure. The intermediate pins may be received by the intermediate apertures 725 and may cause the pin disc to rotate as the first cycloidal disc 722 rotates, thereby providing an output via the central shaft, according to an exemplary embodiment.

In various embodiments, the rotation of the primary shaft 701 in a first direction will cause the rotation of the pivot arm(s) 508 in the first direction, while various other components of the cycloidal drive transmission device 700 may rotate in a second direction that is opposite the first direction. However, in various other embodiments, the rotation of the primary shaft 701 in the first direction may instead cause the rotation of the pivot arm 508 in the second direction.

Furthermore, the cycloidal drive transmission device 700 described herein may be configured with a varying number of ring pins 726, 735, sleeves 727, 736, and lobes 723, 732 so as to alter a speed reduction ratio of the cycloidal drive transmission device 700. Similarly, the ring pins 726, 735 and sleeves 727, 736 may be arranged along a reference pitch circle 742, 743 having a varying diameters correspond to cycloidal discs 722, 731 of similarly varying diameters in order to alter the speed reduction ratio of the cycloidal drive transmission device 700. Relatedly, the position of the intermediate apertures 725, 734 relative to the primary apertures 724, 733 and/or a diameter of the intermediate apertures 725, 734 and intermediate shaft lobes 716, 718 may be varied in order to alter the speed reduction ratio of the cycloidal drive transmission device 700. In various other embodiments, other components of the cycloidal drive transmission device 700 may be altered in order to affect the speed reduction ratio of the cycloidal drive transmission device 700.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the refuse vehicle 10 and the systems and components thereof as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

The invention claimed is:

1. A tipper assembly for a refuse vehicle, the tipper assembly comprising:
   a base configured to couple to a tailgate of the refuse vehicle;
   an actuator assembly comprising an actuator and a cycloidal drive transmission device, the cycloidal drive transmission device including a housing, an input shaft, a first cycloidal disc, a second cycloidal disc, an annulus, and a plurality of intermediate eccentric shafts, the actuator coupled to the cycloidal drive transmission device and configured to provide an input to the input shaft of the cycloidal drive transmission device, the first cycloidal disc rotatably coupled to the second cycloidal disc via the plurality of intermediate eccentric shafts and configured to rotate within the housing about an axis, wherein rotation of the second cycloidal disc is configured to cause a rotation of the annulus, wherein the cycloidal drive transmission device is configured to reduce a speed of the input;
   a brake configured to apply a brake force to limit the rotation of the annulus;
   an arm extending from and pivotally coupled to the cycloidal drive transmission device; and
   an implement coupled to the arm, wherein the implement is configured to engage with a refuse container and move via the annulus of the cycloidal drive transmission device, the implement configured to move from a base position to a dump position to facilitate the dumping of contents within the refuse container into an opening in the tailgate, wherein the cycloidal drive transmission device is configured to selectively facilitate a shake function by overcoming the brake force of the brake with the implement in the dump position.

2. The tipper assembly of claim 1, wherein the arm extends from and is pivotally coupled to the annulus of the cycloidal drive transmission device, the annulus positioned at least partially within the housing and extending at least partially from the housing.

3. The tipper assembly of claim 1, further comprising a linkage pivotally coupled to the cycloidal drive transmission device and engaged with the implement, wherein the cycloidal drive transmission device selectively facilitates the shake function by causing a movement of the linkage relative to the implement.

4. The tipper assembly of claim 1, wherein at least one of the plurality of intermediate eccentric shafts includes a first intermediate eccentric lobe configured to be received by a first intermediate aperture of the first cycloidal disc and a second intermediate eccentric lobe configured to be received by a second intermediate aperture of the second cycloidal disc.

5. The tipper assembly of claim 4, wherein the first cycloidal disc includes a first plurality of intermediate radial apertures and a second plurality of radial apertures, the first plurality of intermediate apertures including the first intermediate aperture, the first plurality of intermediate radial apertures and the second plurality of radial apertures oriented in an alternating fashion along the first cycloidal disc.

6. The tipper assembly of claim 4, wherein the cycloidal drive transmission device further comprises a plurality of ring pins, wherein the input shaft comprises a first eccentric lobe and a second eccentric lobe, the first eccentric lobe configured to be received by a first aperture of the first cycloidal disc, the second eccentric lobe configured to be received by a second aperture of the second cycloidal disc.

7. The tipper assembly of claim 6, wherein the first eccentric lobe and the second eccentric lobe are offset 180 degrees relative to the axis.

8. The tipper assembly of claim 1, wherein a rotation of the second cycloidal disc causes the annulus of the cycloidal drive transmission device to counter-rotate relative to the second cycloidal disc with the annulus positioned at least partially within the housing, wherein the annulus rotates non-eccentrically about the axis, wherein the annulus rotates relative to the housing.

9. The tipper assembly of claim 8, wherein the annulus includes a coupling interface that extends from the housing, wherein the arm is coupled to the coupling interface such that rotation of the annulus causes rotation of the arm about the axis.

10. The tipper assembly of claim 1, wherein the arm is configured to rotate about a pivot axis that is not concentric with the axis.

11. A refuse vehicle, comprising:
   a chassis;
   a body assembly coupled to the chassis, the body assembly defining a refuse compartment;
   a tipper assembly for a refuse vehicle, the tipper assembly comprising:
      a base configured to couple to the refuse vehicle;
      an actuator assembly comprising an actuator and a cycloidal drive transmission device, the cycloidal drive transmission device including a housing, an input shaft, a first cycloidal disc, a second cycloidal disc, an annulus, and a plurality of intermediate eccentric shafts, the actuator coupled to the cycloidal drive transmission device and configured to provide an input to the input shaft of the cycloidal drive transmission device, the first cycloidal disc rotatably coupled to the second cycloidal disc via the plurality of intermediate eccentric shafts and configured to rotate within the housing about an axis, wherein rotation of the second cycloidal disc is configured to cause a rotation of the annulus, wherein the cycloidal drive transmission device is configured to reduce a speed of the input;

a brake configured to apply a brake force to limit the rotation of the annulus;

an arm extending from and pivotally coupled to the cycloidal drive transmission device; and an implement coupled to the arm, wherein the implement is configured to engage with a refuse container and move via the annulus of the cycloidal drive transmission device, the implement configured to move from a base position to a dump position to facilitate dumping contents within the refuse container into the refuse compartment, wherein the cycloidal drive transmission device is configured to selectively facilitate a shake function by overcoming the brake force of the brake with the implement in the dump position.

12. The refuse vehicle of claim 11, wherein at least one of the plurality of intermediate eccentric shafts includes a first intermediate eccentric lobe configured to be received by a first intermediate aperture of the first cycloidal disc and a second intermediate eccentric lobe configured to be received by a second intermediate aperture of the second cycloidal disc.

13. The refuse vehicle of claim 11, the tipper assembly further comprising a linkage pivotally coupled to the cycloidal drive transmission device and engaged with the implement, wherein the cycloidal drive transmission device selectively facilitates the shake function by causing a movement of the linkage relative to the implement.

14. The refuse vehicle of claim 13, wherein the annulus includes a coupling interface defining a plurality of coupling apertures, wherein the arm is coupled to the coupling interface via the plurality of coupling apertures such that rotation of the annulus causes rotation of the arm about the axis, wherein the coupling interface extends from the housing.

* * * * *